Oct. 31, 1961  G. VISCHULIS  3,006,571
WEB TENSIONING SYSTEM
Filed June 23, 1958  9 Sheets-Sheet 1

INVENTOR.
George Vischulis
BY
Carlson, Pitzner, Hubbard & Wolfe
Attys.

Oct. 31, 1961     G. VISCHULIS     3,006,571
WEB TENSIONING SYSTEM
Filed June 23, 1958     9 Sheets-Sheet 5
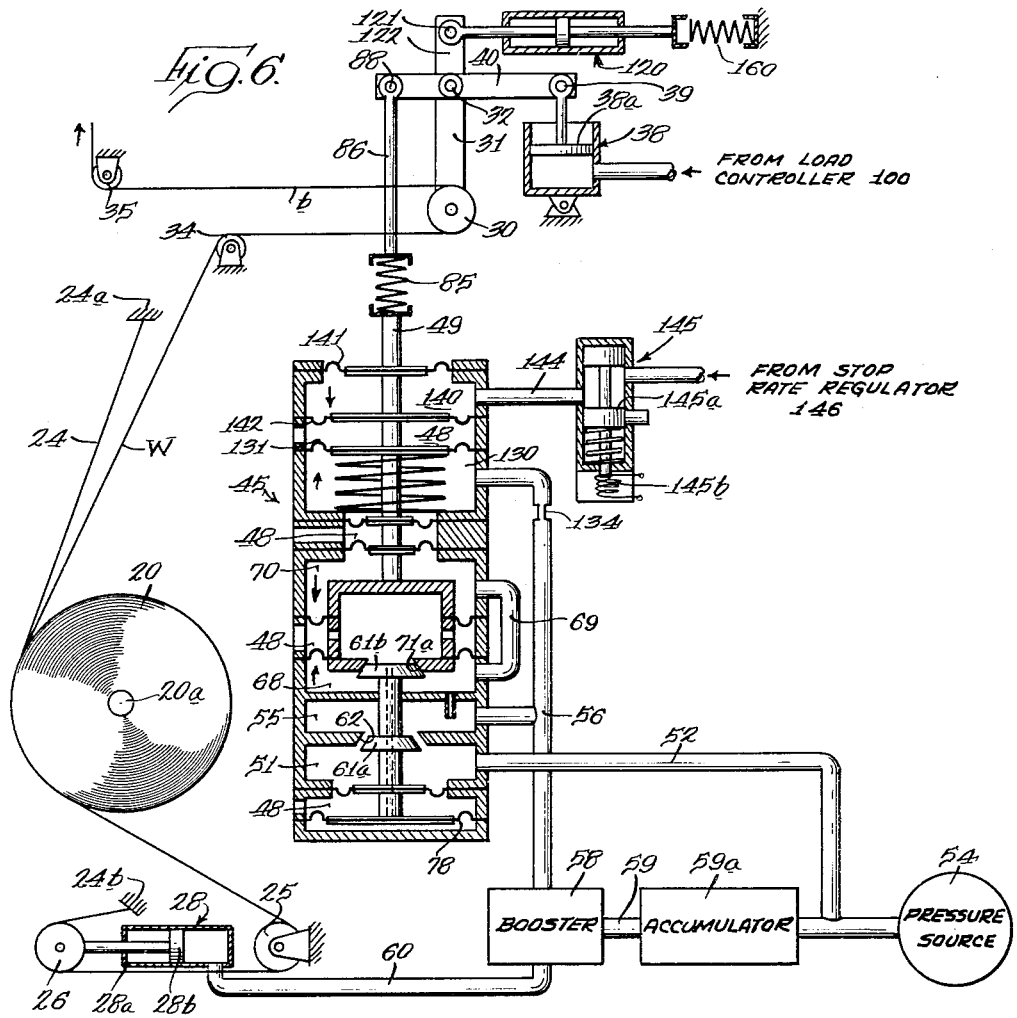
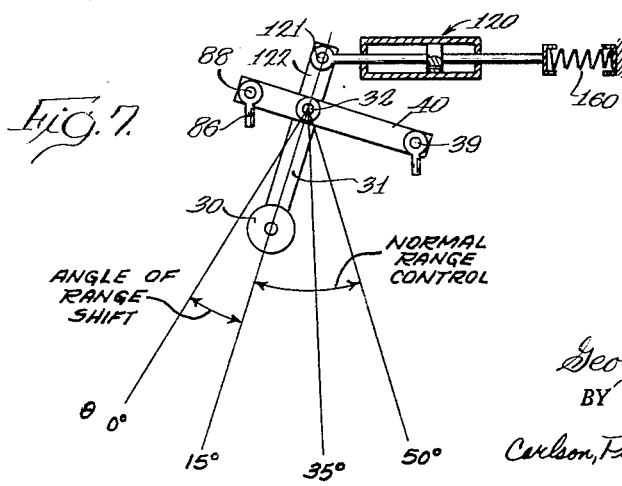
INVENTOR.
George Vischulis
BY
Carlson, Pitzner, Hubbard & Wolfe
Attys.

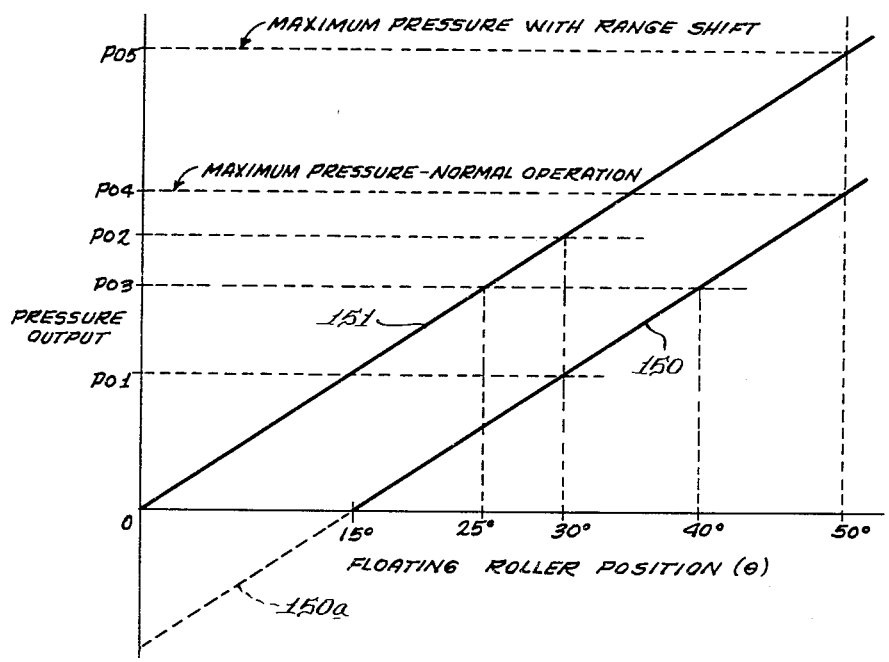
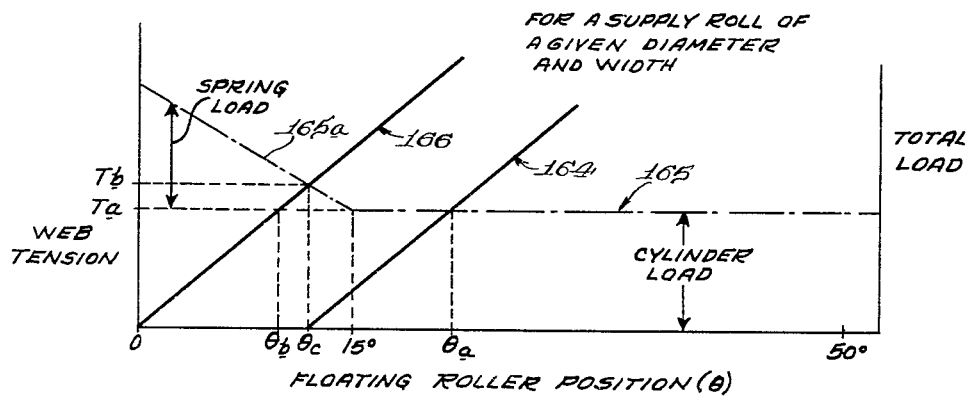

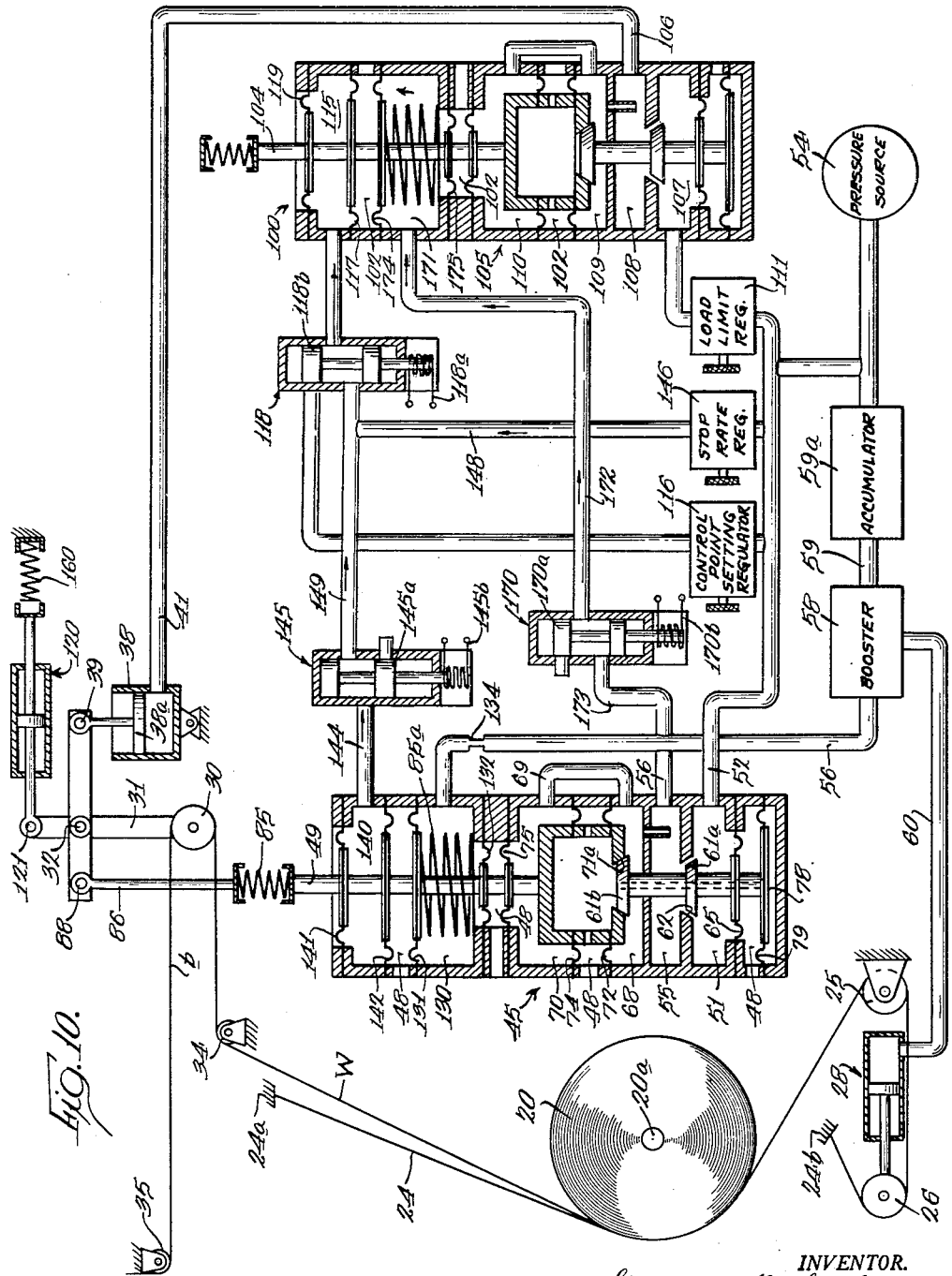

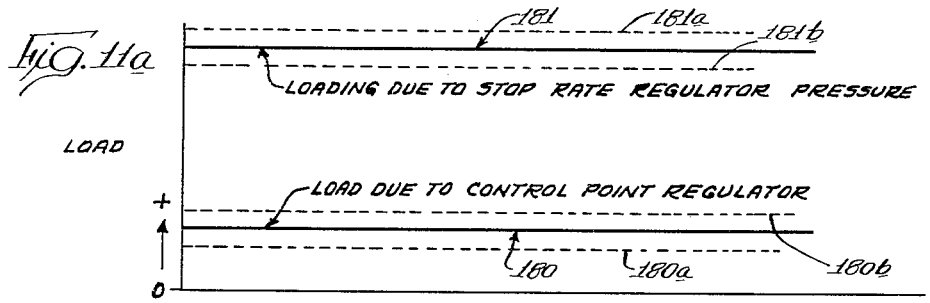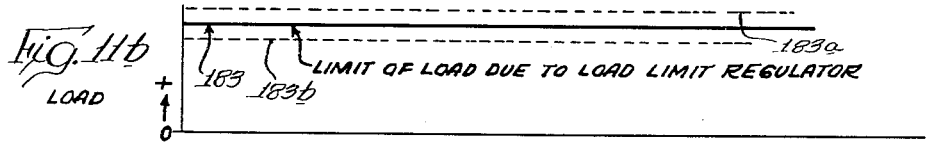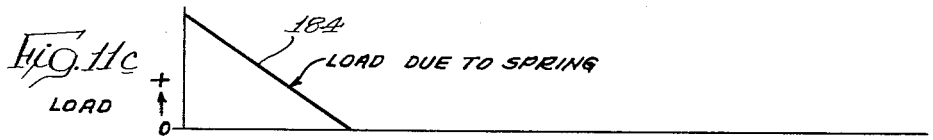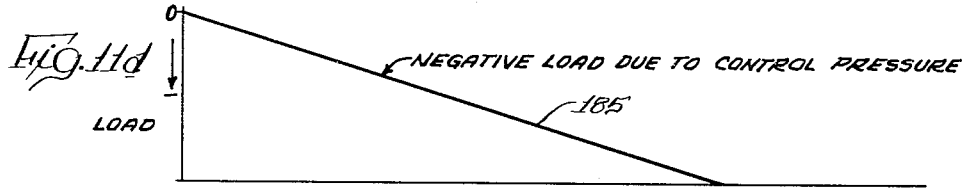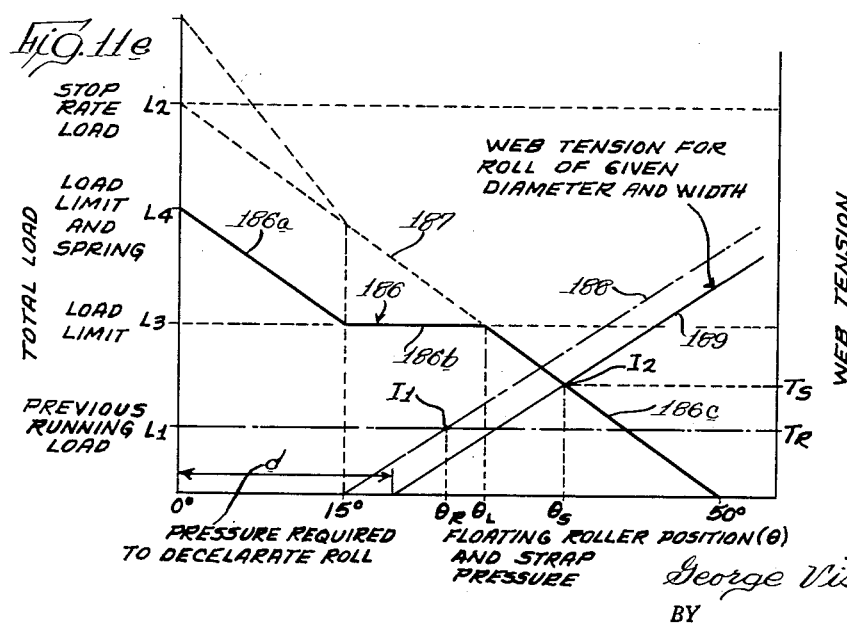

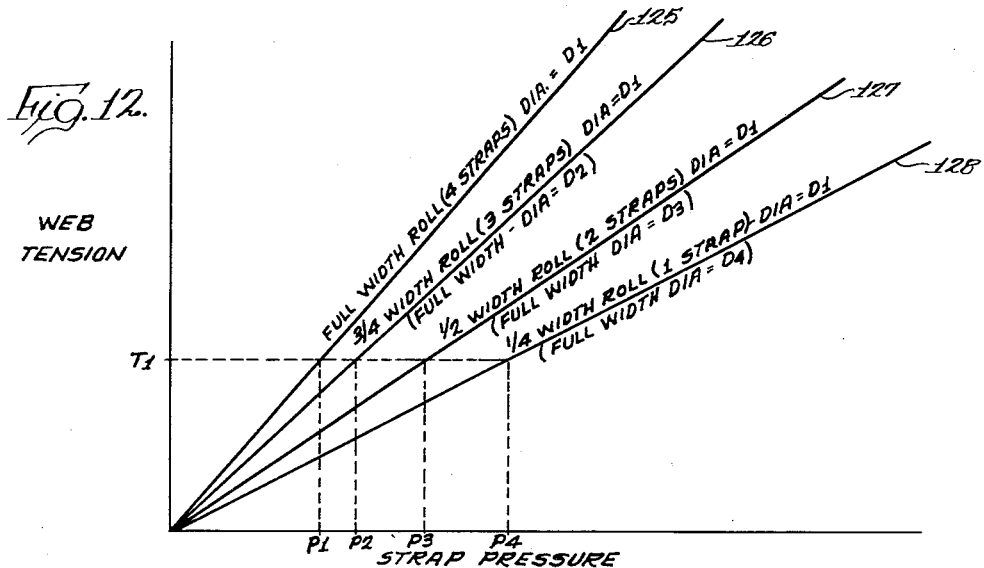
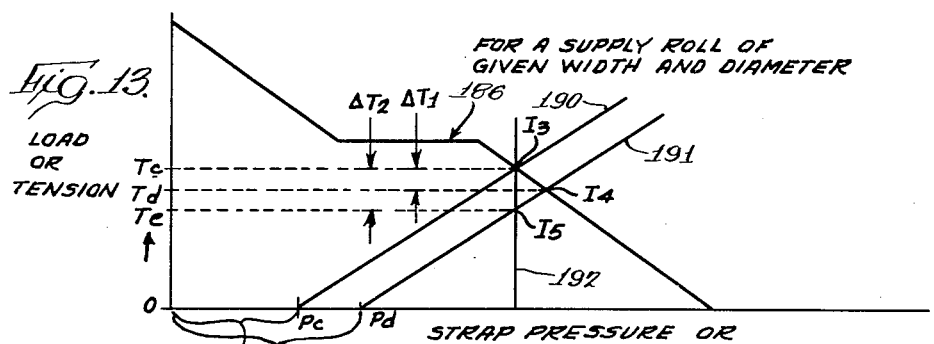
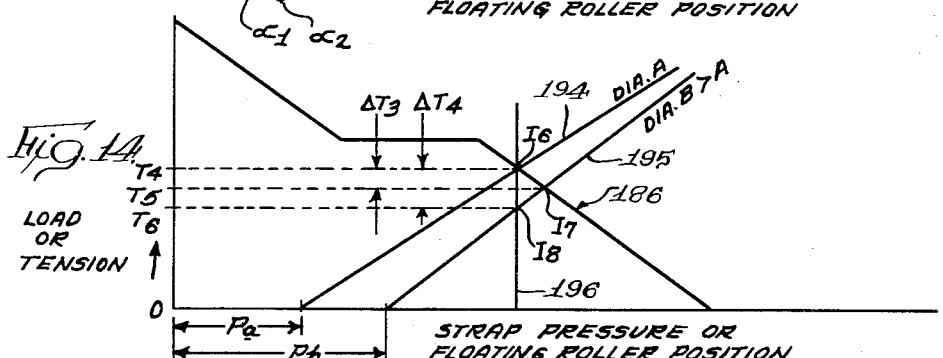

United States Patent Office 3,006,571
Patented Oct. 31, 1961

---

3,006,571
WEB TENSIONING SYSTEM
George Vischulis, Berkeley, Ill., assignor to Miehle-Goss-Dexter, Incorporated, Wilmington, Del., a corporation of Delaware
Filed June 23, 1958, Ser. No. 743,728
26 Claims. (Cl. 242—75.42)

This invention relates in general to systems for maintaining tension in running webs drawn from supply rolls into web-processing apparatus. More particularly, the invention has to do with controlling tension in paper webs supplied to printing presses, so as to prevent web breakage and overprinting.

It is the general aim of the invention to bring forth a web tensioning system characterized by its ability to cope with and automatically correct for any of the great number of dfferent operating conditions or variations which may exist as a paper web is drawn from a supply roll into a printing press. More specifically, it is an object of the invention to provide apparatus for automatically creating and maintaining an acceptable value of web tension despite changes in the diameter and width of supply rolls, dynamic unbalance and out-of-round conditions of the supply rolls, abrupt or emergency stopping of the printing press, and jogging the press.

A related object is to provide a web tension control system in which the press operators need make no adjustments as operating conditions change.

Still another object is to provide a web tension control system in which high rate-of-change disturbances are nullified without producing instability through the expedient of making the gain of a controlling transducer greater at higher rates-of-change in the input signal thereto.

A further object of the invention is to eliminate the necessity for a tension-sensing element or floating roller to undergo extensive translational movement from one position to another as changing conditions are encountered, by creating a range shift in the controlling device.

An additional object is to provide a minimum value of the controlled web tension when the printing press is jogged, such value being automatically increased during jogging from the running value of controlled tension if the setting for the latter is very low. This assures that slack does not occur in the web when the press is decelerated after a short, jogging acceleration. A related objective is to make the minimum equilibrium value of web tension during jogging higher for larger diameter supply rolls, since the inertia of such rolls and the possibility of slack in the web is greater.

It is still another object of the invention to provide web tension controls which act automatically to produce almost the same web tension on abrupt decelerations, e.g., "red button" stops of the printing press, regardless of variations in the deceleration rate, and in the diameter and rotational inertia of the supply roll. In this connection, it is a related object not only to keep the web tension control system in operation during those periods when the printing press is stopping, but to change the loading or control point setting automatically during those periods in order to provide a suitable control point in the event the normal (running) control point setting is improper for the stopping operation., Another related object is to make the loading or control point setting change inversely with the braking force applied to a supply roll during deceleration or press stoppage, so that an equilibrium value of web tension is obtained which is almost the same for different diameter supply rolls and different deceleration rates.

It is also an object of the invention to acheive the foregoing by relatively simple and reliable apparatus which may be readily installed on existing printing presses and the like.

Other objects and advantages will become apparent as the following description proceeds, taken in conjunction with the accompanying drawings, in which:

FIG. 6 is a diagrammatic illustration corresponding to a part of FIG. 1 and showing the operative control connections for range shifting;

FIG. 7 is a diagrammatic illustration of the ranges of angular movement of the floating roller;

FIG. 8 is a graph helpful to an understanding of the effects of range shifting;

FIG. 9 is a graphic comparison of the system operation during normal running conditions and jogging conditions;

FIG. 10 is similar to FIG. 1, but illustrates the operative control connections during "red button" or emergency stops of the printing press;

FIGS. 11a–11e are graphs illustrating the operation of the system during "red-button" stops;

FIG. 12 is a graphic illustration showing the variations in web tension as braking strap pressures change for supply rolls of different widths and diameters;

FIG. 13 is a graphic illustration showing web tensions obtained with a given supply roll during press stops at different deceleration rates; and FIG. 14 is similar to FIG. 13, except illustrating web tensions obtained at a given deceleration rate but with supply rolls of two different diameters.

While the invention has been shown and is described in some detail with reference to a particular embodiment thereof, there is no intention that it thus be limited to such detail. On the contrary, it is intended here to cover all modifications, alterations and equivalents falling within the spirit and scope of the invention as defined by the appended claims.

Figure 1:
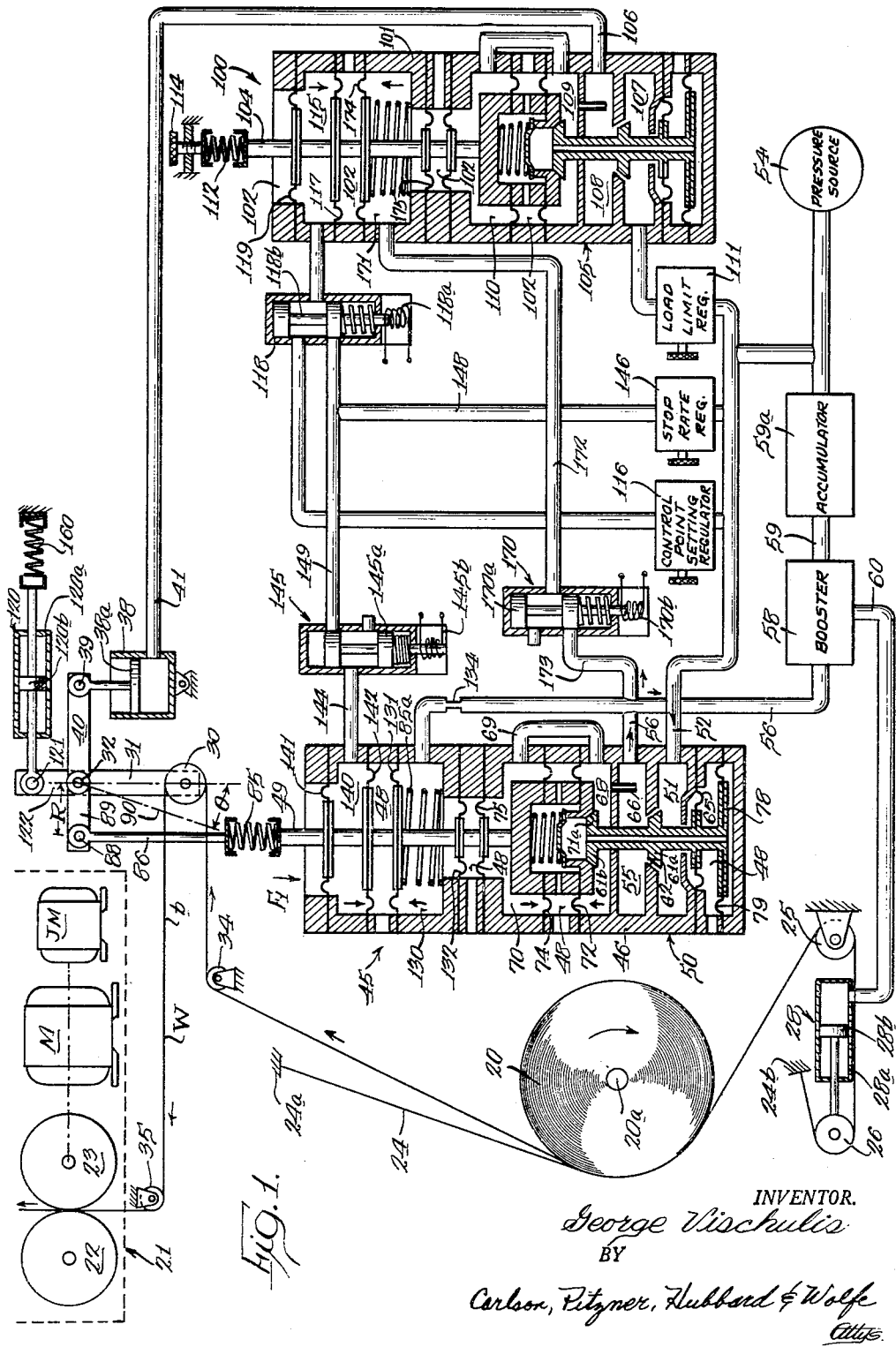
FIGURE 1 is a diagrammatic illustration of a web tensioning system embodying the features of the present invention.

Referring now to FIG. 1, a control system embodying the invention has been shown as controlling the tension in a paper web W drawn from a supply roll 20 into web-processing apparatus here illustrated diagrammatically as a printing press 21. The supply roll 20 is journaled for rotation about an axis 20a, and the web is drawn into the press 20 by printing cylinders 22, 23. The press 21 and the cylinders therein are driven by a main drive motor M, and may be jogged (for example, to thread the web in the press) by a small jogging motor JM.

In order to apply a braking or retarding force to the supply roll 20, and thus create tension in the web W, a strap 24 is frictionally engaged with the periphery of the roll, being anchored at its opposite ends 24a and 24b. To variably tighten the strap, it is trained over rollers 25 and 26, the former being stationary and the latter being carried on the rod of a pneumatic actuator 28 having a piston 28b movable in a stationary cylinder 28a. The piston 28b is urged to the left with a force proportional to the pressure of air supplied to the interior of the cylinder 28a, so that the roller 26 is urged to the left to create a pull or tensioning in the strap 24 which is proportional to that air pressure.

It will be understood by those skilled in the art that several of the straps 24 and actuators 28 are associated with a single supply roll 20, the straps being spaced apart along the roll. The number of straps 24 associated with a particular roll will depend upon the width of that roll. All of the actuators 28 will be supplied in parallel with controlled air pressure. For purposes of description it will suffice to consider only the single strap 24 and the single actuator 28.

To sense the tension existing in the running web W, a floating roller 30 is journaled on the lower ends of two arms 31 (only one being visible) fixed to and depending from a pivot shaft 32. The web W is trained over stationary guide rolls 34 and 35, forming a bight b engaged with the floating roller 30. The floating roller 30 thus tends to be moved to the left, i.e., swung clockwise about the axis of the pivot shaft 32, with a force or torque which is proportional to web tension.

Means are provided to exert a loading force on the floating roller 30 which opposes and counterbalances the web tension force. As here shown, a loading cylinder 38 has a piston 38a slidable therein and pivotally connected at 39 to a radial arm 40 which is fixed to the shaft 32. Air pressure supplied, in a manner to be explained, through a conduit 41 to the cylinder 38 will cause the piston 38a to exert a counterclockwise force or torque on the floating roller 30.

Figure 2:
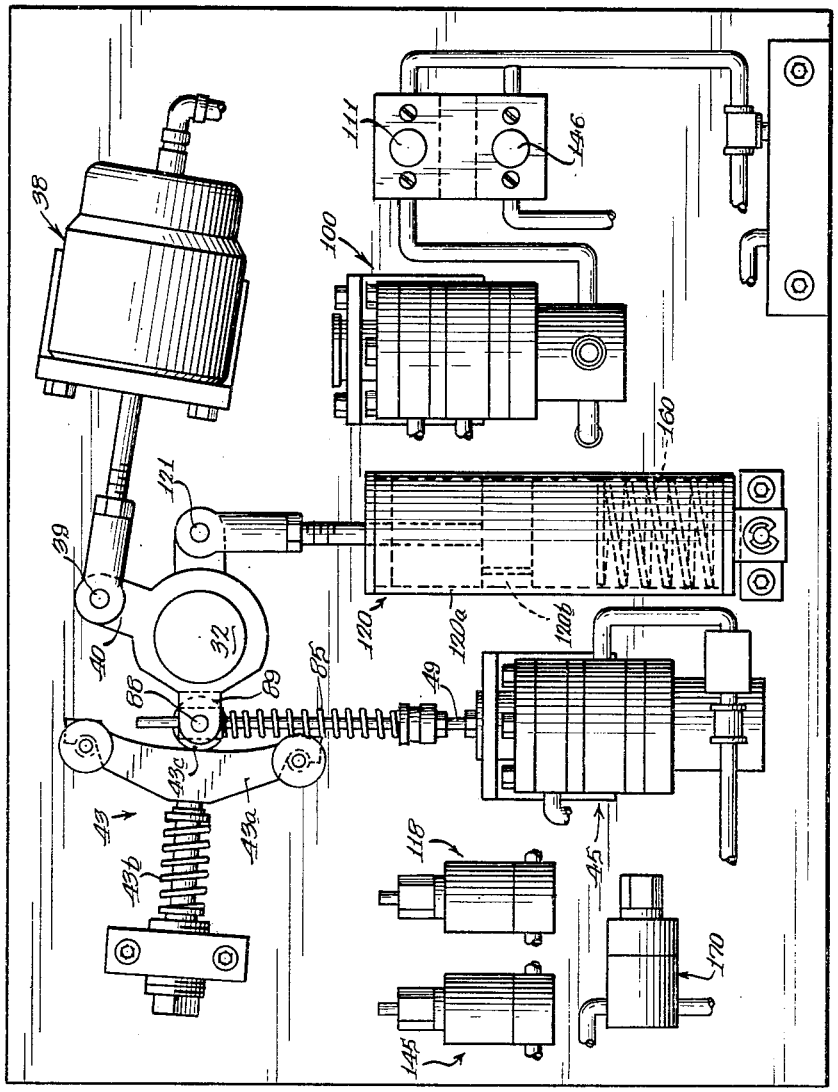
FIG. 2 is an elevational view of a control panel mounting certain components shown in actual physical form and corresponding to parts illustrated only diagrammatically in FIG. 1.

The physical proportions and locations of the various components shown diagrammatically in FIG. 1 are not intended to reflect an actual installation, since such details are a matter of design choice. By way of example, however, FIG. 2 shows the components as mounted in one commercial installation, only the end of the pivot shaft 32 being visible because the depending arms and floating roller are disposed behind the mounting panel. It will be observed that the radial arm 40 is shorter, in proportion to the other elements, than illustrated in FIG. 1, and that the cylinder 38 is disposed at a different angle relative to the pivot shaft 32.

Also shown in FIG. 2 is a cam mechanism 43, including a double-pivoted cam 43a biased by a spring 43b into engagement with a roller 43c journaled on the pivot 88. This mechanism serves to exert a torque on the shaft 32 which counterbalances the torques created by the weight of the floating roller and the reaction of the spring 85. Such mechanism is more fully described and claimed in my copending application Serial No. 747,728, filed July 10, 1958 (now Patent No. 2,984,430, dated May 16, 1961).

Forming a control link between the floating roller 30 and the braking actuator 28 is a fluid pressure pilot controller 45. In general terms, this controller functions to supply fluid pressure to the actuator 28 which is proportional to the displacement of the floating roller from some reference position. As the web tension increases or decreases, the floating roller will swing to the left or the right, so that the pilot controller will decrease or increase the air pressure in the actuator, causing the strap 24 to decrease or increase the braking force on the supply roll 20, and restore the web tension to the desired value or control point.

Figure 3:
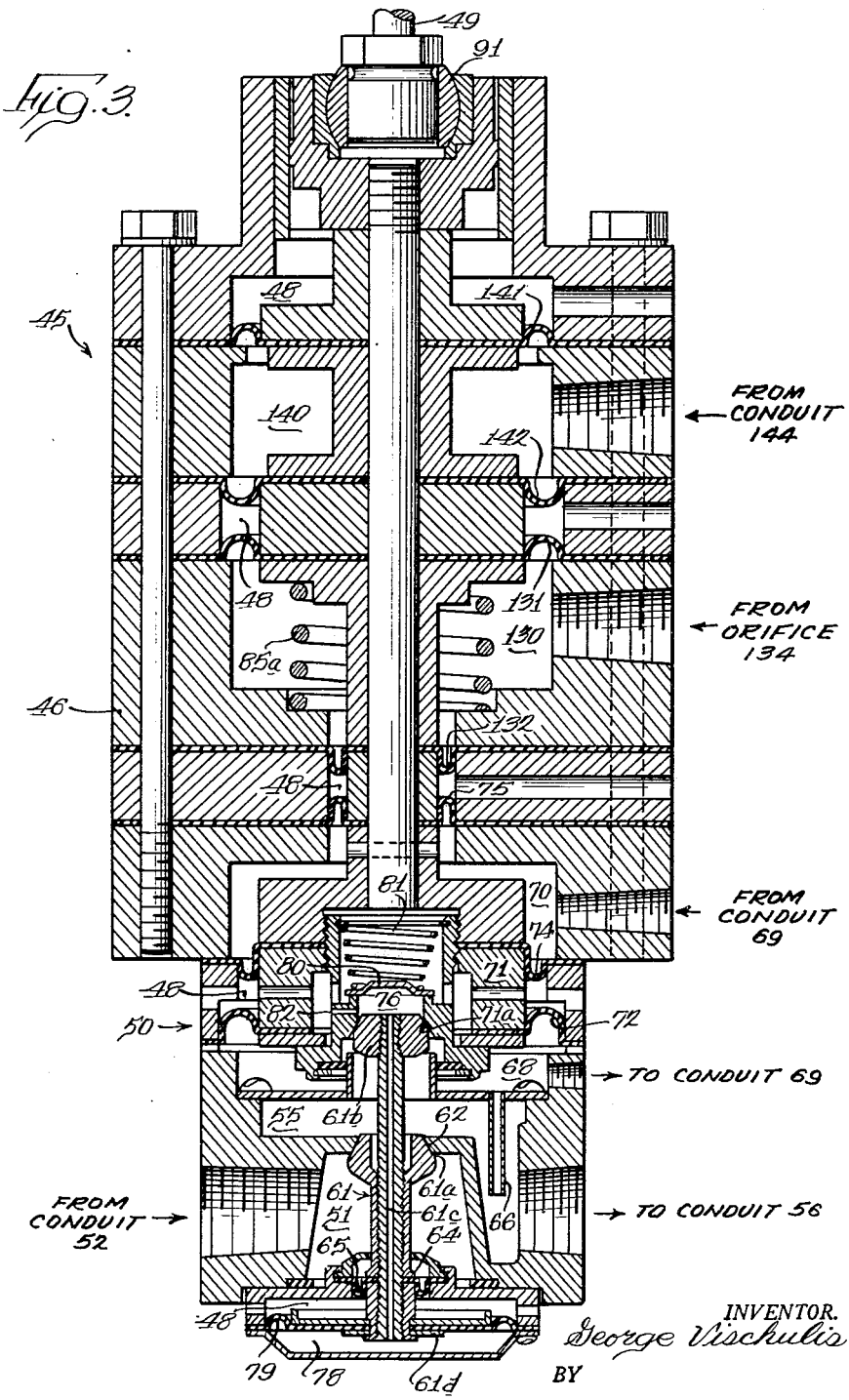
FIG. 3 is a sectional view of a pneumatic controller employed in the system.

As shown in FIGS. 1 and 3, the pilot controller 45 comprises a main housing 46 forming a plurality of chambers 48 which are open to the atmosphere. A control element or rod 49 extends through the housing 46 and governs the operation of a regulating valve assembly 50 in the lower portion of the housing. The valve assembly 50 is more fully described in U.S. Patent No. 2,831,494, issued April 22, 1958, in the name of John F. Taplin. In general terms, such valve assembly functions to produce a regulated output pressure which is proportional to the net input force in one direction (downward) on the control element 49.

The valve assembly 50 has an input chamber 51 which receives air under pressure through a conduit 52 leading from an air pressure source 54 (FIG. 1). It further includes an output chamber 55 from which controlled air pressure is supplied through a conduit 56 to the input of a pneumatic relay or pressure "booster" 58. The latter is a conventional air volume amplifier, having an air pressure input 59 supplied from an accumulator 59a connected with the pressure source 54, and having an output conduit 60 connected to the cylinder 28a. The output pressure appearing in the conduit 60 is proportional to the pressure supplied from the controller 45 to the conduit 56. The booster 58 is employed in the present instance because the controller 45 is located a considerable distance from the brake actuator 28, and large diameter conduits would otherwise be required to efficiently connect the controller to the actuator. Also, the pilot controller 45 may not be large enough to provide sufficient volume or flow of air at regulated pressures; but if the controller is made larger, i.e., with a larger flow capacity, the booster 58 may be omitted.

For completeness, the regulating valve assembly 50 will be briefly described. It includes a main plunger 61 (FIG. 3) formed with a supply valve flange 61a adapted to close and open relative to a valve seat 62. As the plunger 61 moves slightly down or up, the supply valve flange 61a opens and closes relative to the seat 62 to establish or destroy communication between the input chamber 51 and the output chamber 55. The upward force of input pressure on the underside of the flange 61a is counterbalanced by the downward force on a second flange 64 and a flexible diaphragm 65 connected to the housing 46. Thus, variations in input pressure do not tend directly to change the position of the plunger 61 and the opening of the supply valve 61a, 62.

Air at a controlled pressure in the output chamber 55 passes to the output conduit 56. It is also supplied through a tube 66 to a first balancing chamber 68 and through a conduit 69 (FIG. 1) to a second balancing chamber 70. The first such balancing chamber is closed at its upper end by the lower surface of a piston 71 rigid with the control rod 49 and connected to the housing 46 by a diaphragm 72. The pressure in the chamber 68 thus urges the piston 71 and the control rod 49 upwardly, and with a force proportional to output pressure in the chamber 55. The second balancing chamber 70 is closed at its upper and lower ends by flexible diaphragms 74 and 75 connected between the control rod 49 and the housing 46. Pressure in this chamber acts downwardly on the upper surface of the piston 71, partially cancelling the upward force created by pressure in the first balancing chamber 68. The net effect of the two balancing chambers is to produce an upward force on the control element 49 which balances the total downward force thereon, as will be more fully explained. It will be understood that the second balancing chamber 70 could be omitted if the area on the underside of the piston 71 in the chamber 68 were smaller; the second chamber 70 is provided as here shown only to change the sensing area of the valve assembly 50 which is purchased as a standard, commercially available part.

To make the controller 45 produce an output pressure which is proportional to the input force on the control rod 49, yet which is independent of variations in input pressure, a pilot valve is formed between the balance chamber 68 and a pilot chamber 76 by a tapered head 61b on the plunger 61 and a valve seat 71a formed on the piston 71. The pilot chamber 76 communicates through a passage 61c in the plunger 61 with a valve motor chamber 78 closed at its upper wall by a flange 61d on the plunger and a diaphragm 79. Also, a relief valve is formed by a movable cap 80 urged to a position to close the pilot chamber 76 by a compression spring 81. When pressure within the chamber 76 overcomes the force of the spring 81, the cap 80 lifts to vent air through passages 71b in the piston 71, and thence through the adjacent chamber 48 to the atmosphere.

Assume that the downward input force on the control rod 49 is increased. This will cause the pilot valve parts 61b, 71a to firmly engage, and shift the plunger 61 downwardly a slight distance (e.g. .0005 inch). This will open the supply valve 61a, 62 to admit more air from the input chamber 51 to raise the output pressure in the chamber 55. The output pressure will increase until that pressure appearing in the sensing chambers 68 and 70 counteracts the downward force on the control element 49 and slightly opens the pilot valve 61b, 71a, so that air is passed into the chambers 76 and 78 to bring the plunger 61 back to the position where supply valve 61a, 62 closes and brings the valve to equilibrium.

If the output pressure in the chamber 55 should tend to increase or decrease from that value called for by the input force on the control element 49, the balancing force exerted on that element by the chambers 68 and 70 will increase or decrease. Thus, the piston 71 will move slightly upwardly or downwardly, opening or closing the pilot valve 61b, 71a. If the pilot valve opens wider, the pressure in the chambers 76 and 78 increases, so that an increased upward force is exerted on the lower end of the plunger 61, shifting the latter upwardly to partially close the supply valve 61a, 62 until the output pressure is reduced to the desired value. On the other hand, if the pilot valve 61b, 71a closes slightly more, the pressure in the pilot chamber 76 is reduced by bleeding of air to the atmosphere through a small bleed port 82. The pressure in the motor chamber 78 decreases, so the supply valve 61a, 62 opens wider until the pressure in the output chamber 55 is increased to the desired value.

From the foregoing general description, it will be understood that the pressure appearing in the pilot controller output conduit 56 is made proportional to the input force on the control rod 49. In order to exert a first input force on that rod which is proportional to the angular displacement of the floating roller 30, a compression spring 85 (FIG. 1) is interposed between the upper end of the rod 49 and a rod 86 pivoted at 88 to a radial arm 89 on the pivot shaft 32. The spring 85 is preloaded by a second compression spring 85a (FIG. 3), which is conveniently disposed within the housing 46 and which acts with a substantially constant upward force on the control plunger 49. The effective force of the spring 85 is, therefore, the algebraic sum of the actual forces of the springs 85 and 85a, and will be zero when such actual forces are equal.

As the floating roller 30 and its arms 31 swing counterclockwise from a reference position 90 (FIG. 1), the spring 85 will be compressed an amount corresponding to the angle of displacement. Therefore, the springs 85, 85a will exert a downward force on the rod 49 which is substantially proportional to the angle of displacement. The movement of the rod 49 is so small as to be negligible, and the rod 49 is provided with a self-alining coupling 91 (FIG. 3) which permits the spring 85 to remain in direct compression even though the pivot connection 88 swings through a small arc. The cocking of the self-alining coupling is so slight as to be negligible, and the force of the spring 85 may, for practical purposes, be considered as acting directly along the lower portion of the element 49 within the housing 46.

Under normal operating conditions, the loading cylinder 38 (FIG. 1) is supplied with a constant pressure for a given control point setting. However, the control point may be adjusted or varied to determine the value of web tension which is automatically maintained. For this purpose, a load controller 100 is employed, being in general similar in its structure and organization to the pilot controller 45.

As shown in FIG. 1, the load controller 100 has a housing 101 forming a plurality of chambers 102 which are open to the atmosphere. A regulator valve assembly 105 makes the output pressure, supplied through conduits 106, 41 to the loading cylinder 38, proportional to the downward input force on a control element 104. The assembly includes input and output chambers 107, 108 and balancing chambers 109, 110 similar to those described above in connection with the controller 45. Input pressure to the controller 100 is supplied from the source 54 through a manually adjustable pressure regulator, here designated a load limit regulator 111 since it serves to limit the maximum output pressure in the conduit 106. The control element 104 is given a constant downward bias by a spring 112, adjustable by means of a screw 114, so that even if all other input forces on the element are zero, some loading pressure will be supplied to the cylinder 38.

During normal running operation, the input signal or force on the control element 104 is created by air pressure in a chamber 115, the chamber having upper and lower walls formed in part by diaphragms connected between the control element 104 and the housing 101. Such pressure is supplied from the source 54 through a manually adjustable regulator, here designated the control point setting regulator 116, and a three-way valve 118 controlled by a solenoid 118a. The lower diaphragm 117 closing the chamber 115 is larger than the upper diaphragm 119 so that a downward force is exerted on the control element 104 which is determined by the setting of the regulator 116. The output pressure in the conduit 106 is in turn dependent on the setting of the regulator 116, so that the loading force exerted by the piston 38a on the floating roller 30 is determined by such setting.

To impart stability to the system, damping means are associated with the floating roller 30, being here illustrated as a double-acting dashpot 120 having a fluid-filled cylinder 120a in which a ported piston 120b is slidable. The piston is pivotally connected at 121 to an arm 122 fixed to and extending radially from the pivot shaft 32.

*Normal running operation*

The system as shown in FIG. 1 is conditioned for normal running operation, i.e., with the press motor M energized and the web W being drawn from the supply roll 20 into the press 21. Let it be assumed that the desired tension exists in the web W. This means that the counterclockwise force exerted by the loading cylinder 38 on the floating roller 30 is exactly balanced against the clockwise force exerted by the web W. The floating roller and arm 31 will be stationary at a position which makes the output pressure of the controller 45 so condition the booster 58 that the actuator 28 exerts just enough pull on the strap 24 to retard the supply roll sufficiently to create the desired web tension.

If now the tension should increase or decrease, the web tension force on the floating roller 30 will exceed or fall below the loading force, and the pivot shaft 32 will rotate clockwise or counterclockwise, respectively. This, in turn, will decrease or increase the compression of the spring 85, and correspondingly change the force exerted by that spring on the control rod 49. Therefore, the output pressure in the conduit 56 will decrease or increase, so thaat the booster 58 will reduce or increase the pressure supplied to the actuator 28. With this, the brake strap 24 will be loosened or tightened to decrease or increase the web tension until it is restored to the desired value.

It is to be emphasized that the desired value of web tension is achieved when the web tension force on the floating roller 30 equals the loading force thereon, and the floating roller is stationary. Thus, the value of web tension which is maintained depends upon the pressure supplied by the controller 100 to the loading cylinder 38, and this in turn is determined by the setting of the control point regulator 116. The angular position or displacement of the floating roller does not directly reflect the tension in the web W, since the frictional braking torque on the supply roll 20, for a given pressure in the actuator 28, depends upon several variable factors. These include the coefficient of friction between the strap 24 and the surface of the supply roll, the diameter of the supply roll and the angle of wrap of the strap 24 thereabout. Moreover, the number of straps engaged therewith will in part determine the value of web tension created by a given pressure in the associated actuators.

FIG. 12 illustrates these latter relationships. The straight lines 125—128 respectively indicate web tension (or total web pull on the floating roller) vs. strap pressure for supply rolls of a given diameter $D_1$, but of full, three-quarter, one-half and one-quarter widths, engaged by fours, three, two or one brake straps. It will be seen that web tension is greater, for a given diameter supply roll, when the number of straps is increased to engage a wider supply roll.

The straight lines 125—128 in FIG. 12 also may be viewed as illustrating the web tension vs. strap pressure relationships for a full width supply roll, as the latter is consumed and reduced from full diameter $D_1$ to successively smaller diameters $D_2$, $D_3$ and $D_4$. This is indicated by the legends in parentheses in FIG. 12. It will be seen that in order to maintain a given tension $T_1$ as a supply roll is consumed, and reduced from full diameter $D_1$ through the decreasing diameters $D_2$, $D_3$ and $D_4$, the strap pressure must increase from the value $P_1$ through the values $P_2$, $P_3$ and $P_4$. This is due to the fact that as the diameter of the supply roll decreases, the angle of wrap or arc of engagement between the brake strap 24 and the roll surface decreases. This means that as a given roll is consumed and reduced in diameter, the equilibrium position of the floating roller 30 (FIG. 1) will gradually shift from left to right, so that the output pressure of the pilot controller 45 is gradually increased, even though the web tension remains substantially constant.

*Changing gain*

With the foregoing in mind, it will now be understood that the angular displacement of the floating roller 30 and the output pressure of pilot controller 45 may have to change slowly in order to correct for the changing diameter of the supply roll 20. Moreover, if the press 21 is slowly increased or decreased in speed, the inertia of the roll 20 will make it tend to lag or overrun so that the web tension will be increased or decreased. To keep the tension constant, the floating roller 30 will shift to decrease or increase the output pressure of the pilot controller 45. These are termed "slow" variations and the system must correct for them with exactness.

To be considered also are "fast" variations, such as rapid fluctuations in web tension due to the supply roll 20 being out-of-round or dynamically unbalanced. With the web W running at a high linear speed, the angular velocity of the supply roll 20 will be fairly great, particularly if the roll has a small diameter. If the roll is out-of-round, high frequency "ripple" or fluctuations in web tension might result, causing double or ghost image printing. Other "fast" variations are caused by high rates of acceleration or deceleration of the press 21, and high speed web splicing or "paster" operations during which the supply roll, in effect, changes from a small to a large diameter. To make the system act rapidly to smooth out such fast variations in tension would require a high gain and thereby make it oversenstive on slow changes, so that hunting or instability would result. To make the system with a high gain but high damping to prevent hunting is to destroy the compliance of the floating roller and its ability to shift quickly from one position to another when web tension increases or decreases. In this connection it may be observed that the dashpot 120 here employed performs a damping function, but it is not a high degree of damping.

In accordance with one feature of the invention, means are provided to automatically make the system respond properly to both "fast" and "slow" web tension changes, without instability and without a high degree of damping of the floating roller. In effect, the gain of the controlling component or pilot controller 45 is made to have a relatively low value when the input disturbance is "slow" or has a low rate-of-change, while that gain is automatically increased when the input signal or disturbance is "fast" or has a high rate-of-change.

The "gain" of the pilot controller 45 is defined as the change in output signal (output pressure) which results from a given change in the input signal (angular displacement of the floating roller 30 or force exerted on the control element 49 by such roller).

As here illustrated, the pilot controller 45 is constructed such that at low rates-of-change, a part of the input force exerted by the springs 85, 85a is cancelled. As the rate-of-change of the input signal or force increases, this cancellation is decreased, until the full input signal or force becomes effective.

Referring to FIGS. 1 and 3 the pilot controller 45 is formed with a chamber 130 closed at its upper and lower ends by large and small diaphragms 131, 132 connected between the control rod 49 and the housing 46. A second force (in addition to that exerted by the spring 85) will be applied to the control rod 49 in an upward direction and which is proportional to the fluid pressure within the chamber 130.

The chamber 130 is connected to the output conduit 56 of the controller through a restricting orifice 134 which has linear flow characteristics, i.e., the flow therethrough varies directly with the pressure differential thereacross. The action of this orifice is to make the pressure within the chamber 130 substantially equal to the output pressure in the conduit 56 when that output pressure changes slowly. In other words, with low rates of change in the output pressure, the orifice 134 appears to be "wide open." On the other hand, as the output pressure undergoes faster changes, the orifice 134 appears, in effect, to close down, and in fact to totally isolate the chamber 130 when the rate-of-change of output pressure is high.

When the angle of floating roller displacement is changing slowly, the orifice 134 in effect adds the chamber 130 to the action of the sensing chambers 68 and 70. When the angle of floating roller displacement is changing rapidly, only the sensing chambers 68 and 70 are effective. Assuming that the chambers 68 and 70 together have a net area $A_1$ on which output pressure acts to urge the control rod 49 upwardly, and the chamber 130 to have an effective area $A_2$ on which pressure acts upwardly, the following relationships can be expressed by formulas:

By its nature, the pilot controller 45 acts to bring the control element 49 to equilibrium with the sum of the forces thereon equal to zero, that is:

$$\Sigma F = 0 \qquad (1)$$

There are three forces on the control element 49, viz:

$F_1$ = the net downward force of springs 85, 85a
$F_2$ = net upward force of balancing chambers 68 and 70
$F_3$ = upward force of chamber 130.

From (1), these three forces must equal zero, i.e.:

$$F_1 + F_2 + F_3 = 0 \qquad (2)$$

The force $F_1$ is directly proportional to the compression of the spring 85 beyond the amount necessary to overcome the preload of the spring 85a. If the angular displacement $\theta$ of the floating roller is measured from a reference position 90 at which the forces of the springs 85, 85a are equal and opposite (their sum is zero), then the force $F_1$ is closely proportional to the angular displacement $\theta$. This is expressed:

$$F_1 = \theta R K_s \qquad (3)$$

where:

θ = angular displacement of roller 30
R = radius of pivot 88 from axis of shaft 32
$K_s$ = constant of spring 85.

The balancing force $F_2$ is the product of output pressure P, times the effective net sensing chamber area $A_1$, and is negative because it acts upwardly:

$$F_2 = -PA_1 \quad (4)$$

When the rate-of-change of roller displacement is "slow," and the orifice 134 is in effect wide open, the force $F_3$ is:

$$F_3 = -PA_2 \quad (5)$$

Therefore, for low rates-of-change, the response of the controller may be written (by combining Equations 2–5):

$$\theta R K_s - PA_1 - PA_2 = 0 \quad (6)$$

To show the effect of changes in the angle θ, Equation 6 may be rewritten:

$$\Delta\theta(RK_s) - \Delta P(A_1) - \Delta P(A_2) = 0 \quad (7)$$

And the gain of the system at "slow" rates-of-change when the orifice 134 appears to be wide open is:

$$\text{Gain} = \frac{\Delta P}{\Delta \theta} = \frac{RK_s}{A_1 + A_2} \quad (8)$$

On the other hand, when the rate-of-change of roller displacement is high, the orifice 134 is in effect closed. Therefore, the change in the force $F_3$ is zero, and from Equation 7 the response of the system is:

$$\Delta\theta(RK_s) - \Delta P(A_2) = 0 \quad (9)$$

The gain of the system at high rates-of-change is:

$$\text{Gain} = \frac{\Delta P}{\Delta \theta} = \frac{RK_s}{A_1} \quad (10)$$

It is to be observed from Equations 8 and 10 that as the rate-of-change of roller displacement increases, the gain of the system increases from a value proportional to $$\frac{1}{A_1 + A_2}$$

to higher value proportional to $$\frac{1}{A_1}$$

It has been found that the effective area $A_2$ is desirably made about seven times greater than the area $A_1$, so that the gain increases by a factor of eight as the rate-of-change of roller displacement increases. In other words, the gain $G_1$ at low rates-of-change is:

$$G_1 = \frac{\Delta P}{\Delta \theta} = \frac{K}{1+7} = \frac{K}{8} \quad (11)$$

and at high rates-of-change, the gain $G_2$ is:

$$G_2 = \frac{\Delta P}{\Delta \theta} = \frac{K}{1} \quad (12)$$

where K is a composite constant.

Figure 5:
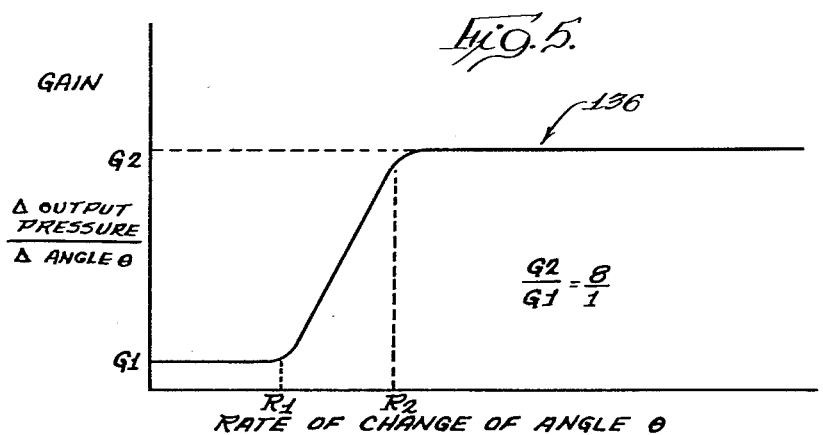
FIG. 5 is a graphic representation of variations in pilot controller gain plotted against the rate-of-change of the input signal.

FIG. 5 illustrates by the curve 136 the variation in gain of the controller 45 as the rate-of-change of the roller displacement θ changes. It will be seen that below a certain rate $R_1$, the gain has a relatively low value $G_1$, while above a certain rate $R_2$ the gain has a value $G_2$ about eight times higher. Between the rates $R_1$ and $R_2$ the orifice 134 (FIG. 1) in effect varies in size, so that the gain increases as the rate increases.

Through the provision of the controller 45 with the chamber 130 connected to the output pressure conduit through the linear orifice 134, the web tension system is made to respond faithfully to slowly changing conditions without hunting. And it is also made to respond rapidly to minimize web tension fluctuations due to "fast" changes. The possibility of slack in the web W or excessive tension which might break the web is reduced under all conditions. Yet the operator of the equipment need not make any critical adjustments as conditions change.

*Range shift*

In the operation of the web tension system, it is necessary to increase the value of the braking force or pressure of the strap 24 on the supply roll 20, compared to the normal running value, under certain conditions which require deceleration of the supply roll and thus dissipation of its kinetic energy. During jogging or emergency "red button" stops, the supply roll 20 must be decelerated to prevent overrunning and possible slackness in the web W. To slow a supply roll having a moment of inertia I at a deceleration α, torque $T_d$ must be exerted, according to the familiar law $T_d = I\alpha$. If prior to deceleration the braking straps are creating a torque $T_w$ just to create the desired web tension, then upon deceleration the total torque must be increased to $T_w + I\alpha$ in order to keep the desired tension in the web. If the total braking torque is less than $I\alpha$, the supply roll will overrun, i.e., if peripheral speed will exceed the linear speed of the web, and cause slack in the latter. If slack occurs, it wall later be removed with a "snap" that will break the web.

Simply increasing the loading on the floating roller 30 has been found insufficient, because that produces not only an increase in the braking force, but will result in an increase in web tension, requiring that the floating roller move rapidly from one angular position to another. The translational inertia of the floating roller and damping applied thereto is sufficiently great as to introduce delays if it is necessary for the roller to shift considerably to reach a new equilibrium point.

In accordance with one aspect of the present invention, means are provided to increase the braking force on a supply roll for a given position of the floating roller 30, so that the latter need not be shifted through a considerable angle in order to quickly increase the retardation of the supply roll and prevent overrunning on deceleration.

Referring to FIG. 1, the pilot controller 45 is provided with still another chamber 140 bounded at its upper and lower walls by flexible diaphragms 141 and 142 connected between the control element 49 and the housing 46. The lower diaphragm 142 is of larger diameter than the upper one, so that any air pressure existing in the chamber 140 will produce a downward force (aiding the spring 85) on the control element 49.

The chamber 140 is connected by a conduit 144 to a three-way valve 145 having a plunger 145a controlled in its position by an associated electric solenoid 145b. When the press motor M is energized to drive the press 21, the solenoid 145b will be energized, as explained below, so that the plunger 145a will be moved to the position illustrated in FIG. 1. Thus when the press is running, the auxiliary chamber 140 is vented through the conduit 144 and the valve 145 to the atmosphere or any other desired pressure source. The chamber 140, therefore, produces little or no effect on the operation of the pilot controller 45.

However, when the press is being either jogged or decelerated during an emergency stop, the solenoid 145b will be deenergized, and the valve plunger 145a restored to that position illustrated in FIG. 6. With this, air pressure from a stop regulator 146 (FIG. 1), supplied from the pressure source 54, will be transferred through conduits 148 and 149, as well as the valve 145, to the auxiliary range shift chamber 140. The relatively high air pressure thus supplied to the chamber 140 from the stop regulator 146 will add an additional force in a downward direction to the control element 49, making it appear as if the spring 85 has been further compressed, even though the angular position of the floating roller 30 has not been changed. As a result, the net input force on the control element 49 is increased, and the output pressure of the controller 45 is immediately increased, causing the booster 58 to supply increased air pressure to the actuator 28. The latter immediately tightens the strap 24.

Figure 4:
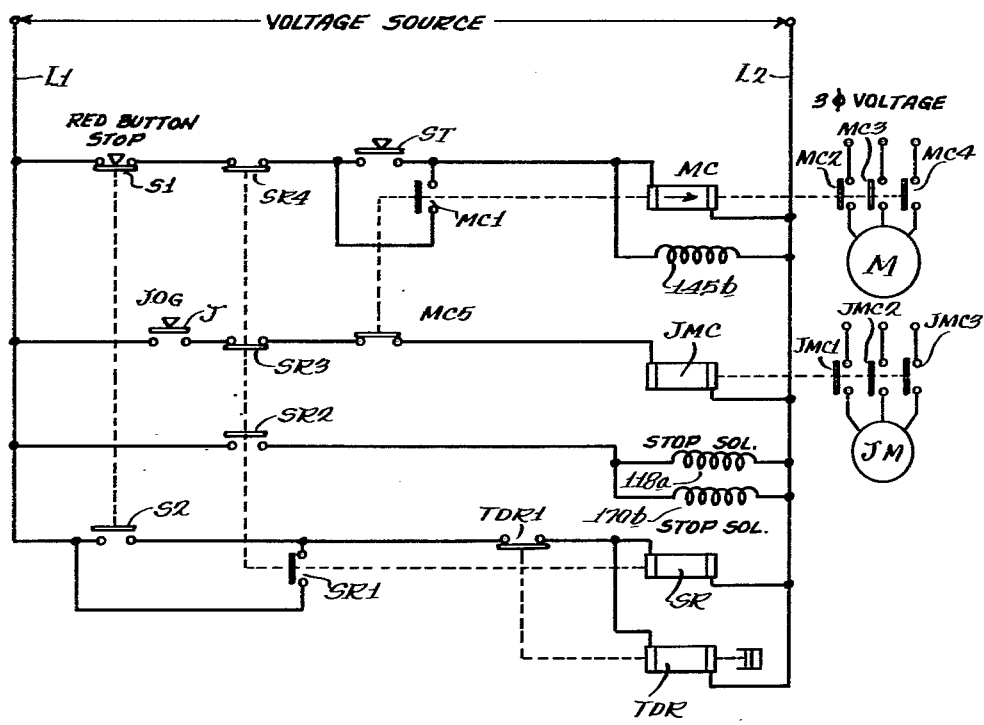
FIG. 4 is a schematic wiring diagram of electrical controls associated with the tensioning system.

The solenoid valve 145 is controlled automatically by means of the electrical control circuit illustrated in FIG. 4. As there shown, the press motor M is selectively energized from a three-phase A.C. voltage source through normally open contacts MC2–4 controlled by a motor contactor coil MC. The latter coil is connected across voltage supply lines L1, L2 through normally closed contacts $S_1$ of a "red button" stop switch, normally closed relay contacts $SR_4$, and the normally open contacts of a pushbutton start switch ST. To start the press, the switch ST is momentarily closed to energize the contactor coil MC so that the contacts MC2–4 energize the drive motor M. Moreover, normally open contacts MC1 close to create a sealing circuit around the switch ST, so that the contactor coil MC remains energized. The valve solenoid 145b is connected in parallel with the contactor coil MC and will, therefore, be energized whenever the drive motor M is energized and the press 21 is running. However, whenever the press is stopped by momentary actuation of the "red button" stop switch, the contacts $S_1$ will open to break the energization circuit for the contactor coil MC and the valve solenoid 145b. Thus, only when the press is running will the valve solenoid 145b be energized and the valve 145 set to that condition illustrated in FIG. 1. When the press is being jogged or is being stopped, the solenoid 145b will be deenergized and the valve 145 placed in that condition illustrated by FIG. 6.

With the press motor M deenergized, the press 21 may be jogged by momentarily depressing and closing a jog switch J. Closure of the latter switch completes an energization circuit through normally closed contacts $SR_3$ and MC5 for a jog motor contactor coil JMC. Energization of the latter results in closure of the normally open contacts JMC1–3 so that the jog motor JM is energized from a three-phase voltage source.

If the press motor M is energized, the contact MC5 controlled by the motor contactor MC will be opened, thereby preventing energization of the jog motor JM. Also, as will be explained, if the press is being stopped, the normally closed contacts $SR_3$ will be open to prevent jogging until the stopping of the press has been completed.

The effect of range shifting can be best understood with reference to FIGS. 7 and 8. Assume that the press is in normal operation and the auxiliary chamber 140 is vented by the solenoid valve 145. Assume also that when the floating roller 30 is at a first reference position, here labeled the 15° position (FIG. 7), the spring 85 is compressed just sufficiently to balance out the preload of the spring 85a so that there is no input force on the control element 49, and the output pressure from the pilot controller 45 is zero. With this, the strap 24 will be relaxed and substantially no braking force will be applied to the supply roll 20. If, then, the floating roller 30 moves from this first reference position, i.e., the 15° position, in a counterclockwise direction under the influence of the loading cylinder 38, the spring 85 will be progressively compressed and the output pressure of the pilot controller 45 will be progressively increased. Under normal running conditions, the floating roller 30 can move between the 15° and 50° positions shown in FIG. 7, with the output pressure of the pilot controller 45 and the booster 58 varying linearly as shown by the graph line 150 in FIG. 8. If the floating roller 30 tends to move to the left from the 15° position in FIG. 7, then it will be calling for a negative pressure output from the pilot controller 45, as indicated by the dotted line portion 150a in FIG. 8. However, the pilot controller 45 cannot supply a negative output pressure.

If now the normal running operation of the press is terminated, that is, the motor contactor MC (FIG. 4) deenergized so that the press is either being stopped or ready for jogging, the solenoid 145b will be deenergized and pressure from the stop regulator 146 supplied to the auxiliary chamber 140 as shown in FIG. 6. With this, an added force is created in a downward direction on the control element 49 so that even though the spring 85 is relaxed to make the net force of the springs 85, 85a zero when the floating roller 30 reaches the 15° position, there will be a finite positive pressure output from the pilot controller 45. Under these conditions, therefore, the output pressure of the pilot controller 45 will vary linearly as shown by the line 151 in FIG. 8 as the floating roller swings from the 0° position (FIG. 7) counterclockwise to the 50° position.

If the floating roller under normal operating conditions is at the 30° angular position and range shifting occurs, i.e., the valve 145 is deenergized, then the output pressure from the pilot controller 45 will immediately increase from the value $PO_1$ determined by the line 150, to the value of $PO_2$ determined by the line 151. This will result in an immediate increase in the braking force applied to the supply roll without the necessity of a change in position of the roller 30, after which the floating roller 30 will be free to shift to a new equilibrium position at which the web tension force on the floating roller is balanced by the loading force.

Viewed in another sense, if the press is running normally and the floating roller is in equilibrium at the 40° position, then the pressure output of the pilot controller 45 will have the value $PO_3$ shown in FIG. 8. If now range shifting occurs, but the loading on the floating roller remains constant, the floating roller will be moved to a new equilibrium position where its angular displacement is 25°, so that the pressure output remains at the value $PO_3$ although the pilot controller is working on the characteristic line 151. In other words, when range shifting occurs, the range of movement of the floating roller (over which the output pressure of the controller 45 is governed) is increased from the 35° span (15° to 50°) shown in FIG. 7 to the 50° span (0° to 50°), so that even though the floating roller moves to the left of the original reference position (15°), the pilot controller 45 continues to provide some output pressure, and an output pressure which is proportional to angular displacement from a second reference position, here shown as the 0° reference position. It will also be seen from FIG. 8 that the maximum pressure output which can be obtained under normal running conditions when the controller is operating on the characteristic line 150 is the value $PO_4$. By contrast, when the auxiliary chamber 140 in the pilot controller receives air pressure, and if the floating roller moves to the 50° position, then the maximum output pressure of the pilot controller has the value $PO_5$, determined by the characteristic line 151.

It will be understood from the foregoing that through the provision of the auxiliary chamber 140 in the pilot controller 45, together with the automatically controlled solenoid valve 145, the effective range of floating roller movements is automatically changed when the printing press is changed from normal running conditions to either jogging or stopping conditions. This enables braking forces necessary for decelerating the supply roll to be created without the delay which would be occasioned if it were necessary for the floating roller to shift through a large angle from one position to another.

Jogging

Whenever the press is jogged, the pushbutton jogging switch J (FIG. 4) will be successively and momentarily closed. Accordingly, the press will be accelerated during the initial portion of each jogging cycle, and then decelerated. The supply roll 20 must also be accelerated and decelerated. The only force which can accelerate the supply roll 20 is that which is applied thereto through the web W. Therefore, during the initial portion of each jogging cycle, the web tension will be of a relatively high value required to accelerate the paper roll 20 at a rate compatible with the printing press cylinder acceleration rate. This high web tension constitutes an error or departure from the control point setting, and swings the floating roller to the left, so that the pilot controller 45 is caused to reduce its output pressure.

On the other hand, during the later portion of each jogging cycle, the supply roll 20 must decelerate. Due to the fact that it may have considerable rotational inertia, extra braking force must be applied thereto in order to dissipate its kinetic energy, and this braking force does not contribute to the web tension. Thus, during the later portion of each jogging cycle the pressure created in the strap 24 by the actuator 28 must be great, that is, great enough to decelerate the supply roll and at the same time create some tension in the web W.

When jogging of the press occurs, the pilot controller 45 is shifted in its range of operation as previously explained. Thus, even though the increase in web tension (above the control point setting) which is required to accelerate the supply roll overcomes the loading force on the floating roller 30 and causes the latter to move to the left of the 15° position (FIG. 7) the pilot controller will still provide a pressure output so that the strap 24 exerts some braking force on the supply roll. However, the increase in web tension required to accelerate the supply roll may be so great that web tension force on the floating roller 30 will greatly exceed the loading force of the cylinder 38, particularly if the regulator 116 has been set to a low control point. Thus, the floating roller 30 may be shifted in a clockwise direction to a considerable degree, thereby decreasing the compression of the control spring 85 to such an extent that the output pressure of the pilot controller will be considerably reduced. This, in turn, will reduce the pressure of the strap 24 against the supply roll. Yet, just as soon as acceleration in the early portion of a jogging cycle ends, considerable pressure of the strap 24 is required to decelerate the supply roll and keep slack out of the web W. If the strap 24 is slackened during the acceleration portion of a jogging cycle, it may not retighten sufficiently fast during the ensuing deceleration to prevent slack in the web.

In accordance with the invention, provision is made to insert an "artificial" control point setting into the system to prevent complete loosening of the strap 24 due to the tension error caused by acceleration of the supply roll during jogging.

In order to prevent the floating roller 30 from moving so far to the left (FIGS. 1 and 7) that the output pressure of the pilot controller is reduced almost to zero, means are provided to increase the total loading force applied to the floating roller as the latter moves toward the 0° position. For this purpose, a spring is associated with the floating roller and arranged to be progressively compressed by the latter as it moves from the 15° position (FIG. 7) clockwise toward the 0° position.

As shown in FIG. 1, a compression spring 160 is mounted with one end fixed and with the other end adapted to be engaged and compressed by the piston rod of the dashpot 120 as the floating roller 30 and its arm 31 swing clockwise beyond a predetermined position. Alternatively, the spring 160 may be located to engage the arm 31. All that is required is that the spring 160 be progressively compressed and exert an auxiliary loading or counterclockwise force on the floating roller which adds to the regular loading force produced by the loading piston 38a. In the actual physical arrangement which has been constructed and tested, the spring 160 is physically located within the cylinder 120a of the dashpot 120, being arranged such that it will be engaged and compressed by the piston 120b as the floating roller reaches and moves to the left from its 15° position.

The results of such increase in the total loading force on the floating roller 30 may be best understood with reference to FIG. 9. Assuming that a supply roll of a given diameter and width is being acted upon by the braking strap 24, then the web tension will vary with the angular position of the floating roller under normal running conditions as illustrated by the line 164. If, under these normal running conditions the loading force on the floating roller exerted by the cylinder 38 has a constant value represented by the dash-dot line 165, the floating roller will be at equilibrium when its angular position has the value $\theta_a$, to produce a running tension $T_a$.

If now the press is no longer running, but is being jogged, then range shifting will make the web tension vary with the angular position of the floating roller as illustrated by the line 166. If the load on the floating roller were left constant at that value represented by the line 165, then the floating roller would tend to swing to a position $\theta_b$ in order to create the web tension value $T_a$. It would swing even further to the left due to tension in the web required to accelerate the supply roll.

However, through the provision of the spring 160, as the floating roller 30 swings to the left from the 15° position (FIG. 7), a progressively increasing counterclockwise or total loading force will be exerted on the floating roller due to the compression of that spring. The total loading force on the floating roller will thus be the sum of that exerted by the loading cylinder 38 and the spring 160, and will vary with the angular position of the floating roller as shown by the line 165a in FIG. 9. Under these conditions therefore, the web tension force will counterbalance the total loading force on the floating roller when the latter occupies the angular position $\theta_c$, thereby producing an equilibrium web tension value $T_b$. Through the provision of the auxiliary loading spring 160, the web tension which is maintained during jogging of the press is increased, while the extent to which the floating roller moves to the left is decreased. This assures that when the supply roll 20 is decelerated after the jogging motor is deenergized, the pressure exerted by the strap 24 on the supply roll is sufficient to prevent overrunning of that roll, and thus to prevent slack in the web. Moreover, it assures that even when the loading force exerted by the cylinder 38 is very low, there will be sufficient force exerted by the spring to positively and quickly shift the floating roller 30 back to the right as the web tension decreases when the acceleration portion of a jogging cycle ends.

Emergency "red button" stops

A "red button" stop is known in the printing art as a stoppage of the printing press as quickly as possible under emergency conditions. It is so called because red pushbutton switches are located at different points around the press to be actuated for stopping the press in emergencies.

Whenever the press is running at a high speed, and the supply roll 20 has a fairly large diameter, the combination of its rotational inertia and angular velocity makes it possess a considerable amount of kinetic energy. If the press is stopped suddenly, that supply roll will continue to rotate or overrun, and thus create large slack loops in the web W unless the braking force applied thereto by the strap 24 is immediately and considerably increased.

Yet, the deceleration rate may change or may have a different value, and the diameter of the supply roll may be either large or small. Moreover, the press may be running with a supply roll of different widths. As each of these conditions changes, the amount of torque required simply to decelerate the supply roll will change. And any braking torque which exceeds the value necessary to prevent overrunning of the roll on deceleration will then create tension in the web W. If the braking torque applied to a roll is far in excess of that required to decelerate the roll, then the tension in the running web may become so great as to break the latter.

In accordance with the present invention, provision is made to not only decelerate supply rolls of different diameters when the press is running at different speeds, prior to a red button stop, but also to maintain an acceptable value of tension in the web during press stoppage and which does not change appreciably as the roll diameter and deceleration rate vary. For this purpose, provision is made, first, to automatically change the loading force exerted on the floating roller so that the control point or web tension value which will be automatically maintained is suitably adapted to the existing conditions of press deceleration rate and roll width. Secondly, provision is made to range shift the pilot controller 45, as previously described. Thirdly, provision is made to vary the loading force applied to the floating roller inversely as the braking pressure exerted by the strap 24 on the supply roll 20, that is, inversely as the output pressure of the pilot controller 45.

In practicing the foregoing, the solenoid valve 118 is arranged to be energized and the plunger 118b shifted from the position illustrated in FIG. 1 so that the control point setting regulator 116 is disconnected from the chamber 115 in the load controller 100, and so that the output pressure of the stop rate regulator 146 is supplied to that chamber. The output pressure of the stop rate regulator 146 is on the order of three to four times greater than the output pressure of the regulator 116, so that the downward force exerted on the control element 104 is considerably increased whenever the press is being stopped, with the result that the output pressure appearing in the conduit 106 is abruptly increased to increase the loading force applied by the piston 38a to the floating roller 30.

Secondly, the solenoid valve 145, which has its solenoid 145b normally energized when the press is running, is deenergized on press stops to connect the auxiliary chamber 140 in the pilot controller 45 to the output of the stop rate regulator 146, thereby range shifting the pilot controller 45, as previously described.

Thirdly, another solenoid valve 170 having a spring-biased plunger 170a controlled in its position by an electric solenoid 170b is arranged to vent a feedback chamber 171 in the load controller 105 when the press is running. That is, when the press is running normally, the plunger 170a is in the position shown by FIG. 1, and the chamber 171 is vented or connected to the atmosphere through a conduit 172 and the valve 170. Thus, under normal running conditions the chamber 171 produces no effect on the operation and output pressure of the load controller 100. The solnoid 170b is, however, energized whenever the press is being stopped, so that the chamber 171 is connected by conduits 172, 173 to receive the output pressure of the pilot controller 45 which appears in the conduit 56.

As shown in FIGS. 1 and 10, the feedback chamber 171 is closed at its upper and lower ends by flexible diaphragms 174 and 175 connected between the control element 104 and the housing 101. The upper diaphragm 174 is of larger area than the lower diaphragm, so that air pressure within the chamber 171 creates an upward force on the control element 104 which opposes and partially cancels the downward force created by air pressure in the chamber 115.

Referring again to FIG. 4, an exemplary arrangement is there illustrated for automatically controlling the energization of the solenoids 118a and 170b. Whenever the press is to be rapidly stopped, for example, if some emergency condition exists, the "red button stop" switch will be momentarily depressed. This will open the switch contacts $S_1$ to deenergize the press drive motor M as previously explained. It will also result in momentary closure of contacts $S_2$ completing an energization circuit for a stop relay SR through normally closed time delay relay contacts TDR1. Upon energization of the stop relay SR, the latter seals in through its own normally open contacts $SR_1$, while the contacts $SR_2$ close to energize the solenoids 118a and 170b of the solenoid valves 118 and 170.

It will require some finite time for the press to come to a complete stop. This is usually on the order of 8 to 12 seconds. In order to maintain the solenoids 118a and 170b energized during this entire press stopping period, a time delay relay is employed, having a coil TDR connected in parallel with the stop relay SR. The time delay relay TDR controls the contacts TDR1, and is so constructed that the latter will open approximately 12 seconds after the coil TDR is energized. It will, therefore, be apparent that when the stop relay SR is energized and sealed in, its contacts $SR_2$ will be closed to energize the solenoids 118a and 170b. Some 12 seconds later the contacts TDR1 will open to break the energization circuit for the stop relay SR, so that the latter drops out, re-opening the contacts $SR_2$ and deenergizing the solenoids 118a and 170b. The stop relay SR also controls normally closed contacts $SR_3$ and $SR_4$. These latter contacts will be open during the period in which the press is stopping, thereby disabling the circuits for the drive motor contactor MC and the jog motor contacts JMC.

With the foregoing in mind, reference may be made to FIGS. 10–14 for a better understanding of the improved performance which is obtained upon emergency stoppage of the printing press. FIG. 10 illustrates the web tension control system with the operative connections which are established by the solenoid valves 145, 118 and 170 during press stoppage. It will be seen that the auxiliary range shift chamber 140 in the pilot controller receives input pressure from the stop rate regulator 146, while the input chamber 115 of the controller 100 is disconnected from the control point setting regulator 116 and instead receives the higher output pressure of the stop rate regulator 146. Moreover, the output conduit 56 of the pilot controller 45 is connected directly to the feedback chamber 171 of the load controller 100, so that a negative input force is supplied to the control element 104 in proportion to the output pressure of the pilot controller 45.

Referring now to FIGS. 11a–e, FIG. 11a shows first the loading force or torque exerted on the floating roller by the loading cylinder 38 as a result of pressure supplied from the controller 100 in response to the input pressure in the chamber 115. This loading force is plotted against the angular position of the floating roller, but remains constant or independent of the floating roller position. Thus, the straight line 180 in FIG. 11a represents the loading force applied to the floating roller as a result of pressure supplied to the chamber 115 from the control point regulator 116 during normal running conditions. The associated dashed lines 180a and 180b simply indicate that the loading provided by the control point setting regulator during normal running can be adjusted by varying the setting or output pressure of the regulator 116.

When emergency stopping of the press occurs, the stop rate regulator 146 will supply an increased air pressure to the chamber 115. As a result, the loading force created on the floating roller due to pressure in the chamber 115 will be increased to the value represented by the straight line 181. This value may be adjusted to the higher or lower values 181a, or 181b by adjusting the pressure output of the manually controllable stop rate regulator 146.

FIG. 11b illustrates the maximum output pressure of the load controller 100. That is, as the total downward or input force on the control element 104 is progressively increased, the output pressure appearing in the conduit 106 cannot under any circumstances exceed the value of input pressure supplied to the chamber 107. The setting of the load limit regulator 111 permits adjustment of this input pressure, and therefore determines the upper limit of the output pressure. The straight line 183 in FIG. 11b illustrates that this limit pressure value remains fixed under all conditions and for all positions of the floating roller. The limit value can be increased or decreased to the values represented by the dotted lines 183a or 183b by adjusting the setting of the loading limit regulator 111.

FIG. 11c illustrates by the line 184 the auxiliary loading force imparted to the floating roller 30 by the auxiliary spring 160. It will be observed that this spring creates zero loading force so long as floating roller occupies an angular position of 15° (FIG. 7) or greater. As that angular position decreases through 15° toward 0°, the loading force created by the spring 160 will very nearly linearly increase.

FIG. 11d by the straight line 185 illustrates the negative loading effect, for various angular positions of the floating roller 30, produced as a result of feeding the output pressure of the pilot controller 45 to the feedback chamber 171 in the load controller 100. It will be recalled that the output pressure of the pilot controller 45 is substantially proportional to the displacement of the floating roller 30 from a reference position and, with the pilot controller 45 range shifted, is proportional to the displacement of the floating roller from the 0° position. Thus, while the output pressure of the pilot controller 45 increases as the angular displacement of the floating roller 30 increases, this output pressure is caused to exert an upward force on the load controller element 104. As the floating roller 30 increases its angular position, the pressure in the chamber 171 will tend to decrease the output pressure of the controller 100, and will thus tend to decrease the loading force exerted by the cylinder 38. The curve 185, therefore, illustrates that as the angular position of the floating roller 30 increases, the loading on that floating roller 30 which is produced in response to pressure in the feedback chamber 171 progressively or linearly decreases.

FIG. 11e illustrates the summation of the relationships represented by FIGS. 11a–d. The solid line 186 shows the variation in the net loading force on the floating roller 30 as the angular position of the latter changes during emergency stops of the press. When the press is operating under normal running conditions, the total loading force created by the application of pressure from the control point regulator 116 to the chamber 115 will create a constant loading force L1. However, just as soon as the red button switch is actuated to stop the press, and the solenoid valves 118, 145 and 170 in FIG. 1 are conditioned to establish the pneumatic connections illustrated by FIG. 10, then the pressure supplied from the stop rate regulator 146 to the chamber 115 would call for the load controller 100 to produce an output pressure which would make the loading force have a much higher value L2. However, because the load limit regulator 111 prevents the output pressure of the load controller 100 from rising above a predetermined value, the loading value L2 is never achieved, but is limited to a value L3. Nevertheless, if the floating roller should swing over to the 0° position, then the spring 160 would exert a mechanical loading force which could increase the total loading force to the value L4.

It will be recalled that the feedback pressure appearing in the chamber 171 increases as the angular displacement of the floating roller increases in a counterclockwise direction. This pressure, acting in an upward direction on the control rod 104, detracts from the downward force exerted by pressure in the chamber 115. The output pressure of the controller 100 and the loading force on the floating roller would vary with the angular position of the latter, as shown by the dotted line portion 187, except for the fact that the output pressure cannot exceed the limit value L3. When, however, the floating roller displacement reaches and exceeds the value $\theta_L$, the limiting action ceases, and the loading decreases with further angular displacement of the floating roller, shown by the line portion 186c. Summarized, it will be seen that the total load on the floating roller represented by the solid line 186 in FIG. 11e consists of a first sloped portion 186a created by the spring 160, a flat portion 186b established by the setting of the load limit regulator 111, and a second sloped portion 186c which is produced as a result of negative feedback of the pilot controller output pressure to the load controller 100.

The lines 188 and 189 in FIG. 11e depict variations in web tension (plotted against the scale on the right side of FIG. 11e) for different angular positions of the floating roller, with a supply roll of a given diameter and width. The dot-dash line 188 represents web tension variations under normal running conditions, while the solid line 189 illustrates web tension variations during emergency stops.

Under normal running conditions, the web tension force on the floating roller will be equal and opposite to the constant loading L1, as indicated at the intersection $I_1$ of the running load line L1 with the tension line 188. The floating roller comes to equilibrium at the angular position $\theta_R$, producing an equilibrium running tension $T_R$.

During stopping of the press, however, the loading is no longer constant at the value L1. Rather, it varies with the angular position of the floating roller as shown by the composite line 186. Also, the web tension force on the floating roller varies now as shown by the line 189.

The line 189 is displaced from the line 188 because the pilot controller 45 has been range shifted during stoppage, and because much of the braking force applied by the strap 24 to the supply roll 20 does not contribute to web tension, but goes to create the necessary braking torque to decelerate the roll. The scale at the bottom of FIG. 11e may be considered here in terms of the angular position of the floating roller, or in terms of air pressure applied to the actuator 28, since the two are directly related. That portion of strap pressure which is represented at $d$ in FIG. 11e goes only to decelerate the supply roll during stopping and not to the creation of web tension.

During stopping, therefore, the floating roller 30 seeks an equilibrium position $\theta_S$ which makes the web tension force equal and opposite to the loading force, as indicated at the intersection $I_2$ of the tension and loading lines 188, 186. This results in stopping web tension having a value $T_S$.

The important observation to be made from FIG. 11e is that during emergency stops the equilibrium position of the floating roller 30 and the braking pressure of the straps 24 are abruptly increased (from $\theta_R$ to $\theta_S$). Such increased strap pressure creates the added necessary torque on the supply roll to decelerate the latter, plus the torque required to create the stopping tension $T_S$. While the braking pressure of the strap 24 is considerably increased, the web tension $T_S$ during stopping is not very much greater than the normal running tension $T_R$. The fact that the loading force varies inversely with the strap pressure permits the control system to remain in operation, and to seek an equilibrium value of web tension during stopping that does not change appreciably with variations in the deceleration rate or supply roll diameter, and inertia.

It has been explained previously, with reference to FIG. 12, that the tension produced in the running web W is different for a given pressure applied to the strap 24 if the supply roll diameter changes or if the roll width and the total number of straps is changed. It will also be understood that the rotational inertia of a supply roll will vary with its diameter, and the torque necessary to decelerate a given supply roll will be greater for greater deceleration rates.

FIG. 13 illustrates for purposes of comparison the web tensions which are maintained in the running web W with the press drawing paper from a supply roll of a given diameter and width and stopping at two different deceleration rates. Assume first that during stopping of the press at a first rate $\alpha_1$, the web tension varies relative to strap pressure or floating roller position as illustrated by the straight line 190. That is, a certain strap pressure $P_c$ will be required to decelerate the supply roll and the remaining strap pressure will create progressively increasing web tension as shown by the rising line 190. With a total loading variation represented by the composite curve 186, the loading and tension forces on the floating roller will be equal and opposite at the intersection $I_3$, indicating that the value of stopping tension will be $T_c$. If, however, the press is decelerated at a greater rate $\alpha_2$, then a greater strap pressure $P_d$ will be required to exert the necessary decelerating torque on the supply roll; added strap pressure above the value $P_d$ will cause a progressively increased web tension as shown by the line 191. This latter line intersects the composite load curve 186 at the point $I_4$, indicating that an equilibrium tension value $T_d$ will be maintained during stopping of the press. Thus, even though the deceleration rate of the press is increased from the value $\alpha_1$ to a higher value $\alpha_2$, the tension which is maintained during stopping of the press will change only by a small amount $\Delta T_1$.

FIG. 13 also illustrates by the line 192 the prior practice of disconnecting the control system during emergency stops of the press and applying a constant increased air pressure to the actuator 28 and the brake strap 24 (FIG. 1). The line 192 indicates a typical value of strap pressure which would according to prior arrangements be held constant during stopping. The two lines 190 and 191 representing web tension variations would intersect this line at the points $I_3$ and $I_5$, indicating that when the press is decelerated at the two rates $\alpha_1$ and $\alpha_2$, tension values $T_c$ and $T_e$ will be maintained in the web. If the prior system of applying a constant pressure to the brake strap 24 during press deceleration is employed, then the equilibrium web tension which is obtained for the two different deceleration rates $\alpha_1$ and $\alpha_2$ changes by an amount $\Delta T_2$, which is considerably greater than the change $\Delta T_1$. Therefore, the present arrangement of causing the loading to vary inversely with the angular position of the floating roller and maintaining the pilot controller 45 in operation during emergency stops results in stopping tension values which are more nearly uniform despite the fact that the deceleration rate of the press may be changed.

FIG. 14 is similar to FIG. 13 but compares the changes in stopping web tension which are obtained with two supply rolls of different diameter as the press is decelerated at a given rate. The straight line 194 illustrates variations in web tension plotted against brake strap pressure (or floating roller position) when a first roll of a diameter A is being decelerated at a given rate. The strap pressure $P_a$ is required simply to create the necessary deceleration torque on the supply roll, while increases above the value $P_a$ progressively create increased web tension as illustrated by the line 194. If loading varies with strap pressure or floating roller position as illustrated by the composite curve 186, the intersection $I_6$ indicates that an equilibrium tension value $T_4$ is obtained during stopping of the roll.

On the other hand, if a roll of larger diameter B is being decelerated at the same rate, then a greater strap pressure $P_b$ will be required to create the necessary deceleration torque. Strap pressures above the value $P_b$ will progressively create an increasing value of web tension as illustrated by the straight line 195. The intersection $I_7$ of the line 185 with the loading curve 186 indicates that a web tension value $T_5$ is maintained during stopping. With the present system if emergency stops take place with rolls of smaller and larger diameters A and B, the value of tension maintained in the web will change only by the amount $\Delta T_3$.

The straight line 196 in FIG. 14 illustrates the prior practice of applying a constant pressure to the brake strap actuator 28 (FIG. 1) during emergency stops of the press. This line intersects the line 194 at the point $I_6$, while it intersects the line 195 at the point $I_8$. Thus, it will be apparent that if the old arrangement of applying a constant air pressure to the brake strap actuator during emergency stops were followed, web tension values $T_4$ and $T_6$ would be obtained when supply rolls of smaller and larger diameters A and B are decelerated at a given rate. The equilibrium value of stopping tension would change by an amount $\Delta T_4$, which, as shown in FIG. 13, is considerably greater than the change $\Delta T_3$ in stopping tension which is experienced by employing the arrangement here disclosed.

I claim:

1. In a system for maintaining tension in a running web drawn from a supply roll into web-processing apparatus having drive means which includes means for stopping and means for jogging the apparatus, the combination comprising means for braking said supply roll with a variable braking force, a floating roller, means for exerting a main loading force in one direction on said floating roller, means for exerting a web tension force in the opposite direction on said floating roller, a pilot controller having means for producing an output signal proportional to the displacement of said floating roller in said one direction from a first reference position when the apparatus drive means are running, means for energizing said braking means in accordance with said output signal, means for increasing the gain of said pilot controller as the rate of change of floating roller displacement increases, means responsive to operation of said stopping means and jogging means for shifting said pilot controller to make its output signal proportional to displacements of said floating roller from a second reference position which is spaced from the first in said opposite direction, means for exerting an auxiliary loading force in said one direction on said floating roller and which progressively increases as the latter moves from said first toward said second reference position, and means responsive to operation of said stopping means for changing the magnitude of said main loading force and for making such main loading force vary inversely with said output signal.

2. In a system for maintaining tension in a running web drawn from a supply roll into a printing press having a drive motor, the combination comprising means including a fluid pressure actuator for applying a braking force to said supply roll, a floating roller, a fluid pressure cylinder and piston for exerting a loading force in one direction to said supply roller, means including a bight in said web engaged with said roller for exerting a web tension force on the latter in the opposite direction, a pilot controller having a control element and means for producing an output pressure proportional to the net input force on said element, means for exerting a force on said control element which is proportional to the displacement of said floating roller in said one direction from a first reference position, means for effectively supplying said output pressure to said fluid pressure actuator, means including a first chamber connected to the output of said controller through a linear orifice for making the gain of said pilot controller increase with higher rates of change in the input force on said control element, means including a second chamber and a valve for shifting the range of said pilot controller when said drive motor is deenergized, a load controller, means for causing said load controller to supply a first predetermined value of pressure to said fluid pressure cylinder when said drive motor is energized, and means responsive to stopping of said motor for causing said load controller to supply pressure to said loading cylinder which varies from a second predetermined value inversely with the output pressure of said pilot controller.

3. In a system for maintaining tension in a running web drawn from a supply roll into web-processing apparatus, the combination comprising means for braking said supply roll with a variable braking force, a floating roller, means for exerting a loading force in one direction on said floating roller, means including a bight in said web engaged with said floating roller for exerting a force thereon in the opposite direction, control means for supplying an energizing signal to said braking means which is proportional to the displacement in said one direction of said floating roller from a first reference position, means for range shifting said control means so that the braking means is energized in proportion to the displacement of said floating roller from a second reference position, means for disabling and enabling said range shifting means when said web-processing apparatus is running and stopping, respectively, means for causing said loading means to exert a first predetermined force on said floating roller while said apparatus is running, means for causing said loading means to exert a second force on said floating roller which varies inversely with the magnitude of said energizing signal while said apparatus is being stopped.

4. In a system for maintaining tension in a running web drawn from a supply roll into a printing press having a drive motor, the combination comprising a strap frictionally engaged with the periphery of said supply roll, a fluid pressure actuator connected with said strap to tighten the same against the roll, a floating roller, a loading cylinder for urging said roller in one direction, means including a bight in the web engaged with the roller for urging the latter in the opposite direction, a pilot controller having a control element and including means for producing an output pressure substantially proportional to the total input force thereon, means for supplying fluid to said actuator at a pressure proportional to said output pressure, means for exerting a first force on said control element proportional to the displacement of said roller from a first reference position, means for exerting a second force on said control element except when said drive motor is energized, a load controller having a control member and including means for producing an output loading pressure substantially proportional to the total positive input force thereon, first and second chambers through which said control member extends and including means for exerting forces in positive and negative senses on said member when pressure fluid is admitted respectively thereto, means for normally venting said second chamber and supplying fluid at a first pressure to said first chamber, and means for supplying a second pressure, higher than said first, to said first chamber and for supplying the output pressure of said pilot controller to said second chamber while said drive motor and press are being stopped.

5. In a system for controlling the tension in a web drawn from a supply roll, a controller having a control element and means for providing an output signal proportional to the net input force on said element, means responsive to changes in the web tension for applying a correspondingly changing first input force to said control element, means for applying a second input force to said element which opposes the first force, means for decreasing said second input force as the rate-of-change of said output signal increases, and means for applying a braking force to the supply roll which is proportional to said output signal.

6. In a system for maintaining tension in a running web drawn from a supply roll, the combination comprising means for applying a braking force to said supply roll, a fluid pressure actuator for said braking means, a floating roller, means for applying a loading force in one direction to said floating roller, means including a bight in said web engaged with said floating roller for applying a web-tension force thereto in the opposite direction, a fluid pressure controller having an input adapted for connection to a fluid pressure source and having an output, said controller including a control element and means for producing an output pressure substantially proportional to a net input force applied to such element, means for exerting a first input force on said element which is proportional to the displacement of said floating roller from a reference position, means for supplying fluid to said actuator at a pressure proportional to the output pressure of said controller, a chamber, a linear orifice connected between said controller output and said chamber to create pressure in the latter, and means coupling said chamber and said control element for exerting a second input force proportional to the pressure in said chamber on said control element and in a sense opposing said first input force.

7. In a system for maintaining tension in a running web drawn from a supply roll, the combination comprising a strap frictionally engaged with the periphery of said supply roll, a pneumatic actuator connected to adjustably tighten said strap, a floating roller, means for exerting a substantially constant loading force in one direction on said floating roller, means including a bight in said web trained over said roller for exerting a web-tension force thereon in the opposite direction, a pneumatic controller having an input adapted for connection to an air pressure source and an output effectively connected to said actuator, said controller including a control element and means for producing an output pressure which is substantially proportional to the net input force on such element, means for exerting a first input force on said control element which is proportional in magnitude to the displacement of said floating roller in said one direction from a reference position, a chamber having a movable wall connected to said control element, and a linear orifice connected between said controller output and said chamber to create a second input force on said control element which opposes said first input force and varies as the rate-of-change of such first input force.

8. In a system for maintaining tension in a running web drawn from a supply roll, the combination comprising means for applying a braking force to said supply roll, a fluid pressure actuator for said braking means, a floating roller, means for applying a loading force in one direction to said floating roller, means including a bight in said web engaged with said floating roller for applying a web-tension force thereto in the opposite direction, a fluid pressure controller having an input adapted for connection to a fluid pressure source and having an output, said controller including a control element, means responsive to the output pressure of said controller for exerting a proportional balancing force on said control element which is equal and opposite to a net input force applied thereto so that the output pressure is proportional to the net input force, means for exerting a first input force on said element which is proportional to the displacement of said floating roller from a reference position, means for supplying fluid to said actuator at a pressure proportional to the output pressure of said controller, a chamber, a linear orifice connected between said controller output and said chamber to create pressure in the latter, and means coupling said chamber and said control element for exerting a second input force proportional to the pressure in said chamber on said control element and in a sense opposing said first input force and aiding said balancing force.

9. The combination set forth in claim 8 further characterized by the fact that the two factors of proportionality (a) relating said balancing force to said output pressure and (b) relating said second input force to pressure in said chamber, have a ratio on the order of 1 to 7.

10. For use in a web-tensioning system to convert the displacements of a floating roller engaged by the running web into fluid pressure variations for correctively energizing pressure-operated braking means associated with the supply roll from which the web is drawn, a controller comprising, in combination, a regulating valve having an input and an output and including means for producing an output pressure proportional to the net input force on a control element, means for exerting a first input force on said control element which is proportional to the displacement of the floating roller from a reference position, a chamber associated with said control element to exert a second force on the latter proportional to pressure therein and in opposition to said first force, and a linear orifice connected between the output of said valve and said chamber to thereby increase the gain of said controller as the rate of change of the floating roller displacement increases.

11. A tension control system comprising a supply roll from which a running web is drawn, a floating roller engaged by said running web and having a force exerted thereon which varies with the tension in the web, a force-to-pressure controlling transducer having a gain which increases with increases in the rate-of-change of a primary input force, said controlling transducer including a control element connected to receive a primary input force in one direction from said floating roller, a valve having a pressure input and a pressure output, means for opening said valve in response to a net input force applied in said one direction to said element, a balancing chamber including means to exert a force in the opposite direction on said element and proportional to the pressure in such chamber, means connecting the output of said valve directly to said balancing chamber so that said valve is neutralized when the balancing chamber force equals the net input force, means for venting said output when the balancing chamber force exceeds the net input force, a second chamber including means for exerting a force on said control element in said opposite direction and proportional to the pressure in such chamber, an orifice having linear pressure versus flow characteristics connected between said output and said second chamber, and means for applying a braking force to said supply roll which varies with the output pressure of said valve.

12. The combination set forth in claim 11 further characterized in that the effective area of said second chamber is approximately seven times greater than the effective area of said balancing chamber, so that the gain of the transducer is about eight times greater when the input force has a high rate-of-change than when the input force has a low rate-of-change.

13. In a system for maintaining tension in a running web drawn from a supply roll, the combination comprising means for applying a variable braking force to said roll, a floating roller, means for urging said roller in one direction by a force proportional to web tension and in the opposite direction by a loading force, a controller having a control element and means for producing an output signal substantially proportional to the net input force on said element, means for actuating said braking means in accordance with said output signal, means for exerting a first input force on said element which is proportional to the displacement of said floating roller from a reference position, means for exerting a balancing force on said control element to counteract the net input force on said element, means for exerting a second input force on said control element, and means for selectively changing the value of said second input force to make said output signal vary proportionally to displacements of said floating roller from different reference positions which are determined by the value of said second input force.

14. In a system for maintaining tension in a running web drawn from a supply roll, the combination comprising means for applying a variable braking force to said roll, a floating roller, means for urging said roller in one direction by a force proportional to web tension and in the opposite direction by a loading force, a controller having a control element and means for actuating said braking means with a force proportional to the net input force on said element, means for exerting a first input force on said element which is proportional to the displacement of said floating roller from a reference position, and means for selectively exerting a second input force on said control element to shift the operating range of proportionality between said braking means force and the displacement of said floating roller.

15. In a system for maintaining tension in a running web drawn from a supply roll, the combination comprising means for braking the supply roll, a fluid pressure actuator connected to operate said braking means, a variable pressure fluid regulator having an input adapted for connection to a fluid pressure source and an output effectively connected to said actuator, said regulator also having a control element and means for making the output pressure substantially proportional to the net force on said element, a floating roller, means creating a force on said roller proportional to web tension, means for imparting a loading force to said floating roller in a sense opposite to the tension force, means for imparting a first input force to said control element which is substantially proportional to the displacement of the floating roller from a reference position, and means for imparting a selectively changeable second input force to said control element to shift the range of control movement of said floating roller.

16. In a system for tensioning a running web drawn from a supply roll into web-processing apparatus having drive means and jogging means, the combination comprising a strap frictionally engaged with the periphery of said roll, a pneumatic actuator connected to exert a pull on said strap, a floating roller, means for exerting a loading force in one direction on said floating roller, means training said web around said floating roller to exert a force thereon in the opposite direction proportional to web tension, a pneumatic controller having an input adapted for connection to an air pressure source and an output effectively connected to said actuator, said controller also having a control element together with means for making its output pressure substantially proportional to the net input force on the control element, means for exerting a first input force on said control element which is proportional to the displacement of said floating roller in said one direction from a first reference position, means for automatically exerting a second input force on said control element when said apparatus drive means are de-energized to thereby make the output pressure of said controller proportional to the displacement of said floating roller from a second reference position.

17. The combination set forth in claim 16 further characterized by a spring, means connecting said spring with said floating roller to cause progressive compression of said spring as said floating roller moves in said opposite direction from said first reference position, so that the reaction force of said spring on said floating roller adds to said loading force.

18. In a system for maintaining tension in a running web drawn from a supply roll, the combination comprising means for applying a variable braking force to said roll, a floating roller engaged by a loop in the running web and urged in one direction by the tension in the web, means for applying a loading force in the opposite direction to said floating roller, control means for energizing said braking means in proportion to the displacement of said floating roller from a first reference position during normal running operation, means for range shifting said control means during jogging of said web so that said braking means is energized in proportion to the displacement of said floating roller from a second reference position, a spring, means connecting said spring with said floating roller to cause progressive compression of said spring as said floating roller moves from said first toward said second reference position so that the reaction force of the spring on said floating roller adds to said loading force.

19. In a system for maintaining tension in a running web drawn from a supply roll, the combination comprising means for braking the supply roll, means for variably actuating said braking means, a controller having a control element together with means for creating an output signal proportional to the net input force on said element, means for energizing said brake actuating means in accordance with said output signal, a floating roller movably mounted and engaged by a loop in the running web to be urged in one direction by a force proportional to web tension, means for exerting a first constant loading force in the opposite direction on said floating roller, means for exerting a first input force on said control element which is proportional to the displacement of said roller from a first reference position in the direction of said loading force, means for exerting a selectively changeable second input force on said control element when said web is being jogged to make the net force on said control element proportional to the displacement of said roller from a second reference position, and means for exerting a second loading force on said floating roller which increases as the latter moves from said first to said second reference position.

20. In a system for maintaining tension in a running web drawn from a supply roll, the combination comprising a brake strap frictionally engaging the periphery of the roll, a pressure fluid actuator connected to said strap for urging the latter against the roll, a variable pressure fluid regulator having an input adapted for connection to a fluid pressure source and an output effectively connected to said actuator, said regulator also having a control element together with means for making the output pressure proportional to the net input force on said element, a floating roller movably mounted and engaged by a loop in the running web to be urged in one direction by a force proportional to web tension, means for exerting a constant loading force in the opposite direction on said floating roller, means for exerting a first input force on said control element which is proportional to the displacement of said roller from a first reference position in the direction of said loading force, means for exerting a second input force on said control element when said web is being jogged to make the net force on said control element proportional to the displacement of said roller from a second reference position, a spring, means connecting said spring with said floating roller to cause progressive compression of said spring as said floating roller moves from said first toward said second reference position so that the reaction of said spring on said floating roller progressively adds to said loading force.

21. In a system for maintaining tension in a running web drawn from a supply roll into web-processing apparatus, the combination comprising means for exerting a variable braking force on said supply roll, a floating roller, means for exerting a loading force in one direction on said floating roller, means including a loop in said web trained over said roller for exerting a web tension force in the opposite direction on said roller, control means for energizing said braking means in proportion to the displacement of said roller in said one direction from a reference position, means for controlling the magnitude of said loading force, and means effective when said web-processing apparatus is being stopped for causing said controlling means to change the loading force.

22. In a system for maintaining tension in a running web drawn from a supply roll into web-processing apparatus having drive means, the combination comprising a strap frictionally engaged with the periphery of the supply roll, a fluid pressure actuator connected with said strap to tension the same, a floating roller, fluid pressure means for exerting a loading force in one direction on said floating roller, means including a loop in said web trained over said roller for exerting a web tension force thereon in the opposite direction, means including a pilot controller for supplying fluid to said actuator at a pressure substantially proportional to the displacement of said floating roller in said one direction from a reference position, means including a load controller for supplying a first pressure to said fluid pressure loading means, and means responsive to stoppage of said apparatus drive means for causing said controller to supply a second pressure to said loading means.

23. In a system for maintaining tension in a running web drawn from a supply roll into web-processing apparatus having drive means, the combination comprising means for exerting a variable braking force on said supply roll, a floating roller, means for exerting a loading force in one direction on said floating roller, means including a bight in said running web engaged with said roller for exerting a web tension force thereon in the opposite direction, control means for energizing said braking means in proportion to the displacement of said floating roller in one direction from a reference position, and means for varying said loading force inversely relative to the value of said displacement of said floating roller during stoppage of said apparatus drive means.

24. In a system for maintaining tension in a running web drawn from a supply roll into web-processing apparatus having drive means, the combination comprising means for exerting a variable braking force on said supply roll, a floating roller, means for exerting a variable loading force in one direction on said floating roller, means including a bight in said running web engaged with said roller for exerting a web tension force thereon in the opposite direction, a controller having means for producing an output signal which is substantially proportional to the displacement of said floating roller from a reference position, means for actuating said braking means in accordance with said signal, means for causing said loading force to have a first predetermined value during operation of said apparatus drive means, means for making said loading force vary inversely with changes in said controller output signal from a second predetermined value when said drive means are being stopped, said second predetermined value being greater than the first.

25. In a system for maintaining tension in a running web drawn from an expiring roll into a printing press driven by a motor, the combination comprising a strap frictionally engaged with the periphery of said supply roll, a pneumatic actuator connected to exert a pull on said strap, a floating roller, a pneumatic loading cylinder associated with said roller to exert a force in one direction thereon, means including a bight in said web engaged with said roller for exerting a web tension force thereon in the opposite direction, a first pneumatic controller having means for creating a controlled output pressure substantially proportional to the displacement of said roller from a reference position, means for supplying air at a pressure proportional to said controlled output pressure to said actuator, a second pneumatic controller having a control element and having its output connected to said loading cylinder, said second controller including means for creating a loading output pressure substantially proportional to the net input force on said control element, means for applying a first force to said control element when said press motor is energized, means for applying a second, greater force in lieu of the first force to said control element when said press motor is being stopped, and means for applying to said control element a third force in opposition to said second force and of a magnitude inversely proportional to said controlled output pressure when said press motor is being stopped.

26. The combination set forth in claim 25 further characterized by means for limiting the loading output pressure of said second controller when the net force on said control element exceeds a predetermined value.

References Cited in the file of this patent

UNITED STATES PATENTS

| | | |
|---|---|---|
| 2,286,282 | Joesting | June 16, 1942 |
| 2,333,670 | Parker | Nov. 9, 1943 |
| 2,334,164 | Lotz | Nov. 16, 1943 |
| 2,743,880 | McWhorter | May 1, 1956 |
| 2,743,882 | Knowles | May 1, 1956 |

FOREIGN PATENTS

| | | |
|---|---|---|
| 607,790 | Great Britain | Sept. 6, 1948 |